US011323723B2

(12) United States Patent
Hannuksela et al.

(10) Patent No.: US 11,323,723 B2
(45) Date of Patent: May 3, 2022

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI);
Alireza Aminlou, Tampere (FI);
Alireza Zare, Tampere (FI)

(73) Assignee: Nokia Technologies Oy, Espoo (FI)

( * ) Notice: Subject to any disclaimer, the term of this patent is extended or adjusted under 35 U.S.C. 154(b) by 903 days.

(21) Appl. No.: 16/077,813

(22) PCT Filed: Feb. 14, 2017

(86) PCT No.: PCT/FI2017/050086
§ 371 (c)(1),
(2) Date: Aug. 14, 2018

(87) PCT Pub. No.: WO2017/140945
PCT Pub. Date: Aug. 24, 2017

(65) Prior Publication Data
US 2021/0227231 A1    Jul. 22, 2021

(30) Foreign Application Priority Data

Feb. 17, 2016 (FI) .................................... 20165114

(51) Int. Cl.
*H04N 19/167* (2014.01)
*H04N 19/176* (2014.01)
(Continued)

(52) U.S. Cl.
CPC ......... *H04N 19/167* (2014.11); *H04N 19/176* (2014.11); *H04N 19/184* (2014.11); *H04N 19/188* (2014.11)

(58) Field of Classification Search
None
See application file for complete search history.

(56) References Cited

U.S. PATENT DOCUMENTS

2012/0023254 A1   1/2012   Park et al.
2014/0119671 A1   5/2014   Lim et al.
(Continued)

FOREIGN PATENT DOCUMENTS

CN       101548548 A    9/2009
EP         2824884 A1    1/2015
(Continued)

OTHER PUBLICATIONS

"Information technology—Dynamic Adaptive Streaming Over Http (DASH)—Part 1: Media Presentation Description and Segment Formats", ISO/IEC 23009-1, Second edition, May 15, 2014, 152 pages.
(Continued)

*Primary Examiner* — Christopher G Findley
(74) *Attorney, Agent, or Firm* — Joseph C. Drish; Harrington & Smith

(57) ABSTRACT

A method comprising obtaining a full-picture track or bitstream including a motion-constrained tile set; and constructing a full-picture-compliant tile set track or bitstream on the basis of the motion-constrained tile set or generating instructions to construct a full-picture-compliant tile set track or bitstream on the basis of the motion-constrained tile set.

20 Claims, 15 Drawing Sheets

(51) Int. Cl.
H04N 19/184 (2014.01)
H04N 19/169 (2014.01)

(56) References Cited

U.S. PATENT DOCUMENTS

| | | | |
|---|---|---|---|
| 2014/0301464 | A1 | 10/2014 | Wu et al. |
| 2015/0016504 | A1 | 1/2015 | Auyeung et al. |
| 2015/0026242 | A1 | 1/2015 | Lim et al. |
| 2015/0215358 | A1 | 7/2015 | Wang et al. |
| 2015/0245059 | A1 | 8/2015 | Terada et al. |
| 2019/0014337 | A1* | 1/2019 | Skupin .............. H04N 19/119 |
| 2019/0141311 | A1* | 5/2019 | Lee ................. H04N 19/597 |

FOREIGN PATENT DOCUMENTS

| | | |
|---|---|---|
| GB | 2516224 A | 1/2015 |
| GB | 2519746 A | 5/2015 |
| GB | 2524531 A | 9/2015 |
| WO | 2015/104303 A2 | 7/2015 |
| WO | 2015/144735 A1 | 10/2015 |
| WO | 2015/197815 A1 | 12/2015 |
| WO | 2015/197818 A1 | 12/2015 |

OTHER PUBLICATIONS

"3rd Generation Partnership Project; Technical Specification Group Services and System Aspects; Transparent end-to-end Packet-switched Streaming Service (PSS); Protocols and codecs (Release 13)", 3GPP TS 26.234, V13.0.0, Sep. 2015, pp. 1-174.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)", 3GPP TS 26.247, V13.2.0, Dec. 2015, pp. 1-93.
Moats, "URN Syntax", Request for Comments (RFC) 2141, Network Working Group, May 1997, pp. 1-7.
Berners-Lee et al., "Uniform Resource Identifier (URI): Generic Syntax", Request for Comments (RFC) 3986, Network Working Group, Jan. 2005, pp. 1-50.
"THX Spatial Audio Platform", THX, Retrieved on Jun. 21, 2018, Webpage available at : http://www.thx.com/consumer/home-entertainment/home-theater/hdtv-set-up/.
"Information Technology—Coding of Audio-Visual Objects—Part 15: Advanced Video Coding (AVC) file format", ISO/IEC 14496-15, First edition, Apr. 15, 2004, 29 pages.
Schulzrinne et al., "RTP: A Transport Protocol for Real-Time Applications", Request for Comments (RFC) 3550, Network Working Group, Jul. 2003, pp. 1-89.
"Information Technology—Generic Coding of Moving Pictures and Associated Audio Information: Systems", Series H: Audiovisual and Multimedia Systems, Infrastructure of audiovisual services—Transmission Multiplexing and Synchronization, Recommendation ITU-T H.222.0, Oct. 2014, 246 pages.
"Information technology—Coding of audio-visual objects—Part 12: ISO base media file format", ISO/IEC 14496-12, Third edition, Oct. 15, 2008, 120 pages.
"Information technology—Coding of audio-visual objects—Part 14: MP4 file format", ISO/IEC 14496-14, First edition, Nov. 15, 2003, 18 pages.
"3rd Generation Partnership Project; Technical Specification Group Services and System Aspects; Transparent end-to-end packet switched streaming service (PSS); 3GPP file format (3GP) (Release 13)", 3GPP TS 26.244, V13.3.0, Dec. 2015, pp. 1-66.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.
"Advanced Video Coding for Generic Audiovisual services", Series H: Audiovisual and Multimedia Systems, Infrastructure of audio-visual services—Coding of moving Video, Recommendation ITU-T H.264, Feb. 2016, 807 pages.
"High Efficiency Video Coding", Series H: Audiovisual and Multimedia Systems, Infrastructure of audiovisual services—Coding of moving video, Recommendation ITU-T H.265, Oct. 2014, 540 pages.
Parameter Values for Ultra-High Definition Television Systems for Production and International Programme Exchange, Recommendation ITU-R BT.2020-2, Oct. 2015, 8 pages.
"Parameter Values for the HDTV Standards for Production and International Programme Exchange", Recommendation ITU-R BT.709-6, Jun. 2015, 19 pages.
"Information Technology—Coding of audio-visual objects—Part 15: Carriage of network abstraction layer (NAL) unit structured video in the ISO base media file format", ISO/IEC FDIS 14496-15, Jan. 13, 2014, 180 pages.
Office action received for corresponding Finland Patent Application No. 20165114, dated Jun. 23, 2016, 11 pages.
Concolato et al., "Usage of DASH SRD for HEVC Tiling", ISO/IEC JTC1/SC29/WG11 MPEG2014/M33210, Telecom ParisTech, Mar. 2014, 10 pages.
Skupin et al., "Compressed Domain Processing for Stereoscopic Tile Based Panorama Streaming Using MV-HEVC", IEEE 5th International Conference on Consumer Electronics—Berlin (ICCE-Berlin), Sep. 6-9, 2015, pp. 160-164.
Office action received for corresponding Finland Patent Application No. 20165434, dated Nov. 30, 2016, 9 pages.
International Search Report and Written Opinion received for corresponding Patent Cooperation Treaty Application No. PCT/FI2017/050086, dated May 12, 2017, 17 pages.
Sanchez et al., "Compressed Domain Video Processing for Tile Based Panoramic Streaming Using HEVC", IEEE International Conference on Image Processing (ICIP), Sep. 27-30, 2015, 5 pages.
Misra et al., "An Overview of Tiles in HEVC", IEEE Journal of Selected Topics in Signal Processing, vol. 7, No. 6, Dec. 2013, pp. 969-977.
International Search Report and Written Opinion received for corresponding Patent Cooperation Treaty Application No. PCT/FI2017/050091, dated May 18, 2017, 15 pages.
Office action received for corresponding Indonesian Patent Application No. P00201804553, dated Aug. 9, 2019 2 pages of office action and 2 pages of translation available.
Office action received for corresponding Korean Patent Application No. 2018-7026699, dated Aug. 26, 2019, 7 pages of office action and 7 pages of translation available.
Office action received for corresponding Indian Patent Application No. 201847034012, dated Jul. 27, 2020, 7 pages.
Extended European Search Report received for corresponding European Patent Application No. 17752728.0, dated Oct. 9, 2019, 11 pages.
Hannuksela et al., "ISO/IEC 14496-15: On Extractor Design for HEVC Files", ISO/IEC JTC1/SC29/WG11 MPEG2016/M37864, Nokia, Feb. 2016, 8 pages.
Gruneberg et al., "HEVC Tile Subsets in 14496-15", ISO/IEC JTC1/SC29/WG11 MPEG114/M37873, Fraunhofer HHI, Feb. 2016, 8 pages.
Office action received for corresponding European Patent Application No. 17752728.0, dated Sep. 15, 2021, 7 pages.

* cited by examiner

APPARATUS, A METHOD AND A COMPUTER PROGRAM FOR VIDEO CODING AND DECODING

RELATED APPLICATION

This application was originally filed as Patent Cooperation Treaty Application No. PCT/FI2017/050086 filed Feb. 14, 2017 which claims priority benefit to FI Patent Application No. 20165114, filed Feb. 17, 2016.

TECHNICAL FIELD

The present invention relates to an apparatus, a method and a computer program for video coding and decoding.

BACKGROUND

In many displaying situations only a partial picture is needed to be displayed while the remaining picture is required to be decoded but is not displayed. These displaying situations include e.g. a typical head-mounted displays (HMDs) display with about 100 degrees field of view, while often the input video for HMD consumption covers entire 360 degrees. Typical flat-panel viewing environments display up to 40-degree field-of-view. When displaying wide-FOV content (e.g. fisheye) on such a display, it may be preferred to display a spatial subset rather than the entire picture.

Conventionally, coded pictures need to be fully decoded, since they have strong spatial dependencies (e.g. intra prediction), entropy coding dependencies, in-loop filtering dependencies, and spatio-temporal dependencies (motion vectors pointing to a different part of the picture). A motion-constrained tile set enables decoding of the tile set independently of other tile sets; however, as the coded tile set may be interleaved with other coded data in the bitstream and as parameter sets and headers (e.g. slice segment header) are for the entire bitstream, a dedicated decoding process is needed for decoding particular motion-constrained tile set, while omitting the decoding of other tiles.

In conventional streaming arrangements for 360-degree video, the full 360-degree video is transmitted. For example, an entire equirectangular panorama is transmitted. However, in many displaying environments, such as consumption on a HMD, only a subset of the 360-degree video is displayed at a time. The streaming bitrate is hence used for picture areas that are not displayed. This may cause a risk of network and/or access link congestion and rebuffering and/or the use of a relatively low quality for the parts of the picture area that are displayed.

SUMMARY

Now in order to at least alleviate the above problems, an improved method for generating a video bitstream is introduced herein.

A method according to a first aspect comprises obtaining a full-picture track or bitstream including a motion-constrained tile set; and constructing a full-picture-compliant tile set track or bitstream on the basis of the motion-constrained tile set.

A method according to a second aspect comprises obtaining a full-picture track or bitstream including a motion-constrained tile set; and generating instructions to construct a full-picture-compliant tile set track or bitstream on the basis of the motion-constrained tile set.

According to an embodiment, the motion-constrained tile set is characterized by being contained in one or more slice segments that also contain tiles outside the motion-constrained tile set, and said constructing or generating instructions to construct comprises: adding, into the full-picture-compliant tile set track or bitstream or into the instructions to construct a full-picture-compliant tile set track or bitstream, a tile column on the right of the motion-constrained tile set.

According to an embodiment, the method further comprises controlling an end of a slice segment with tiles of the added tile column.

According to an embodiment, the method further comprises indicating in the last tile of the added tile column an end of a slice segment.

According to an embodiment, the method further comprises adding, into the full-picture-compliant tile set track or bitstream or into the instructions to construct a full-picture-compliant tile set track or bitstream, information on a conformance cropping window causing decoding to exclude the added tile column from decoding output.

According to an embodiment, the motion-constrained tile set is characterized by being contained in one or more slice segments that also contain tiles outside the motion-constrained tile set, and said constructing or generating instructions to construct comprises: identifying a right-most tile within the motion-constrained tile set that is not a last tile of a first slice segment containing the right-most tile; and modifying the right-most tile so that it causes an end of the first slice.

A method according to a third aspect comprises obtaining a constructed full-picture-compliant tile set track or bitstream, or instructions to construct a full-picture-compliant tile set track or bitstream; and generating information, in a media presentation description, of a first Representation formed from the full-picture-compliant tile set track.

According to an embodiment, the method further comprises generating information, in the media presentation description, of a second Representation formed from the full-picture track or bitstream; associating the first Representation and the second Representation into the same reference space in the media presentation description; and indicating the location and size of the first Representation in relation to the second Representation in the media presentation description.

According to an embodiment, the instructions to construct a full-picture-compliant tile set track comprise an extractor that extracts a part of an elementary unit from the full-picture track or bitstream.

According to an embodiment, the elementary unit is a network abstraction layer (NAL) unit.

According to an embodiment, constructing or generating instructions to construct a full-picture-compliant tile set track or bitstream comprise rewriting parameter sets and/or slice segment headers entirely or partially when compared to those in the full-picture track or bitstream.

According to an embodiment, the instructions to construct a full-picture-compliant tile set track or bitstream result into a sequence of segments or subsegments.

A method according to a fourth aspect comprises obtaining first characteristics of a first full-picture-compliant track from a media presentation description and/or from a media file; determining based on the first characteristics to obtain a part or an entirety of the first full-picture-compliant track; and obtaining the part or the entirety of the first full-picture-compliant track.

According to an embodiment, the method further comprises decoding and playing the part or the entirety of the first full-picture-compliant track.

According to an embodiment, the method further comprises obtaining, within the first characteristics, information of a covered spatial area or both a covered field of view and a view orientation, wherein said determining is based on the covered spatial area or both the covered field of view and the view orientation.

According to an embodiment, the method further comprises obtaining second characteristics of a second full-picture-compliant track from a media presentation description and/or from a media file, concluding from the first and second characteristics that the second full-picture-compliant track has a lower spatial resolution, bitrate, picture quality, bit-depth per color component, dynamic range, and/or color gamut compared to those of the first full-picture-compliant track; concluding from the first and second characteristics that the first and second full-picture-compliant tracks represent different spatial parts of the content; determining based on the above conclusions to obtain a part or an entirety of the second full-picture-compliant track; and obtaining the part or the entirety of the second full-picture-compliant track. Further aspects include at least apparatuses and computer program products/code stored on a non-transitory memory medium arranged to carry out the above methods.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
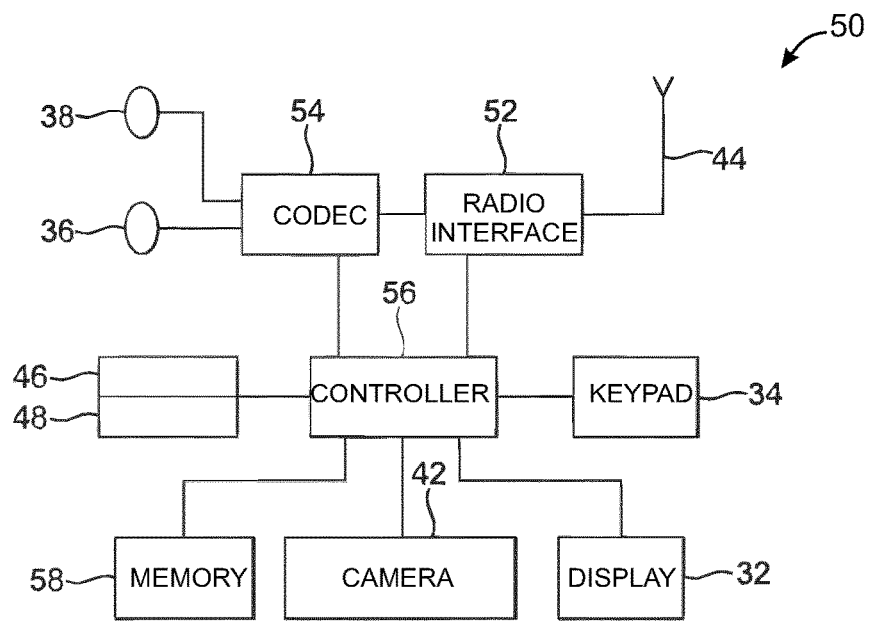
FIG. 1 shows schematically an electronic device employing embodiments of the invention.
Figure 2:
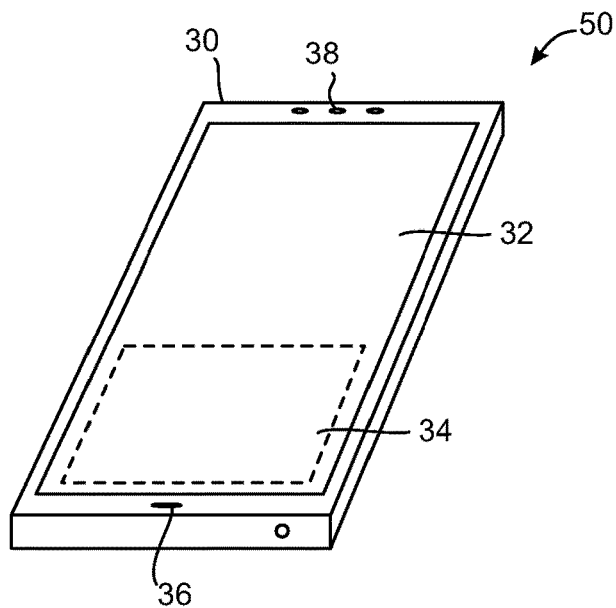
FIG. 2 shows schematically a user equipment suitable for employing embodiments of the invention.

The following describes in further detail suitable apparatus and possible mechanisms for decreasing the downstream bitrate of streaming a scalable video bitstream. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
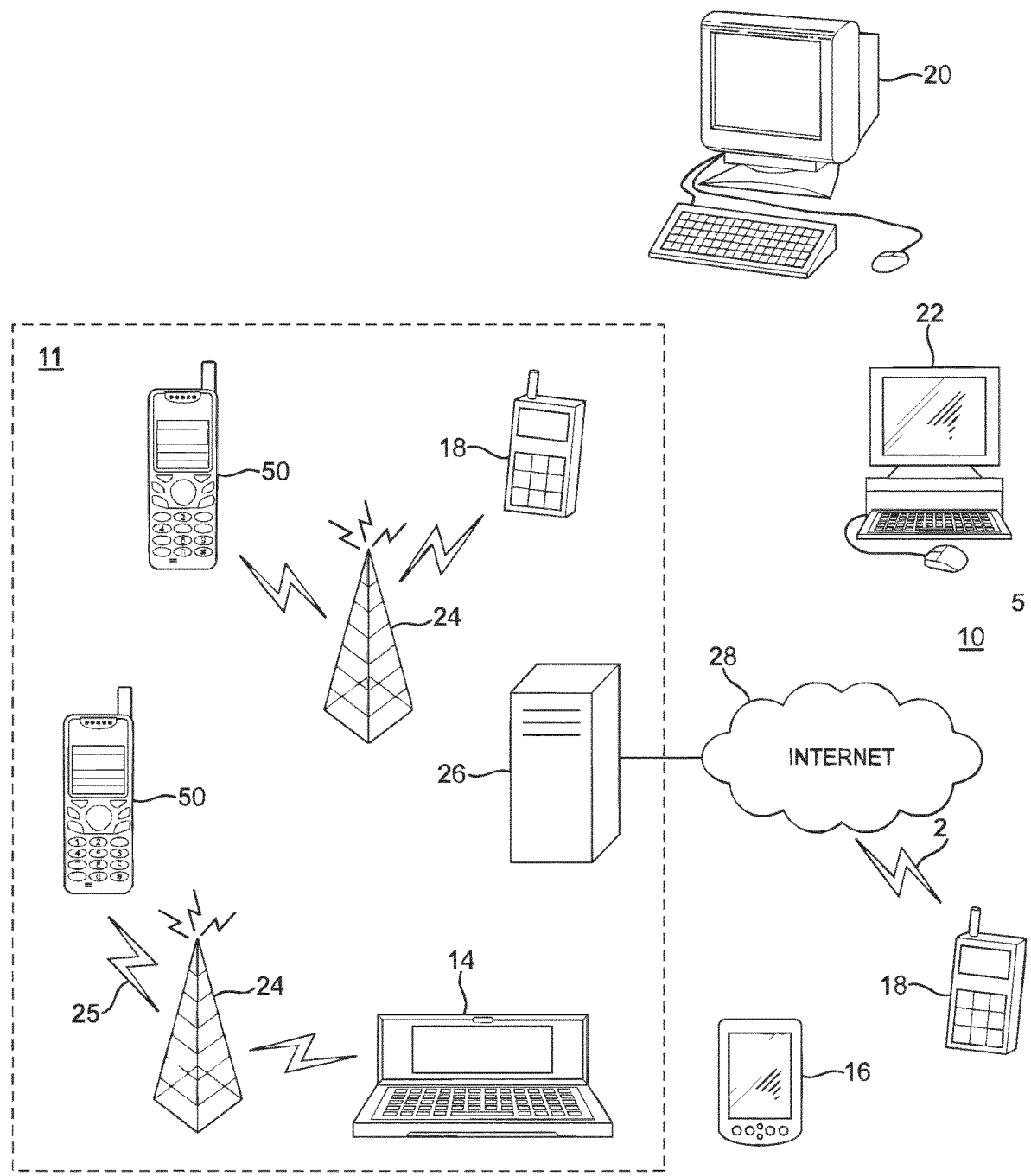
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISOBMFF is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISOBMFF, a file may include media data and metadata that may be enclosed in separate boxes. In an example embodiment, the media data may be provided in a media data (mdat) box and the movie (moov) box (a.k.a. MovieBox) may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISOBMFF). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A sample grouping in the ISOBMFF and its derivatives, such as the file format for NAL unit structured video (ISO/IEC 14496-15), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
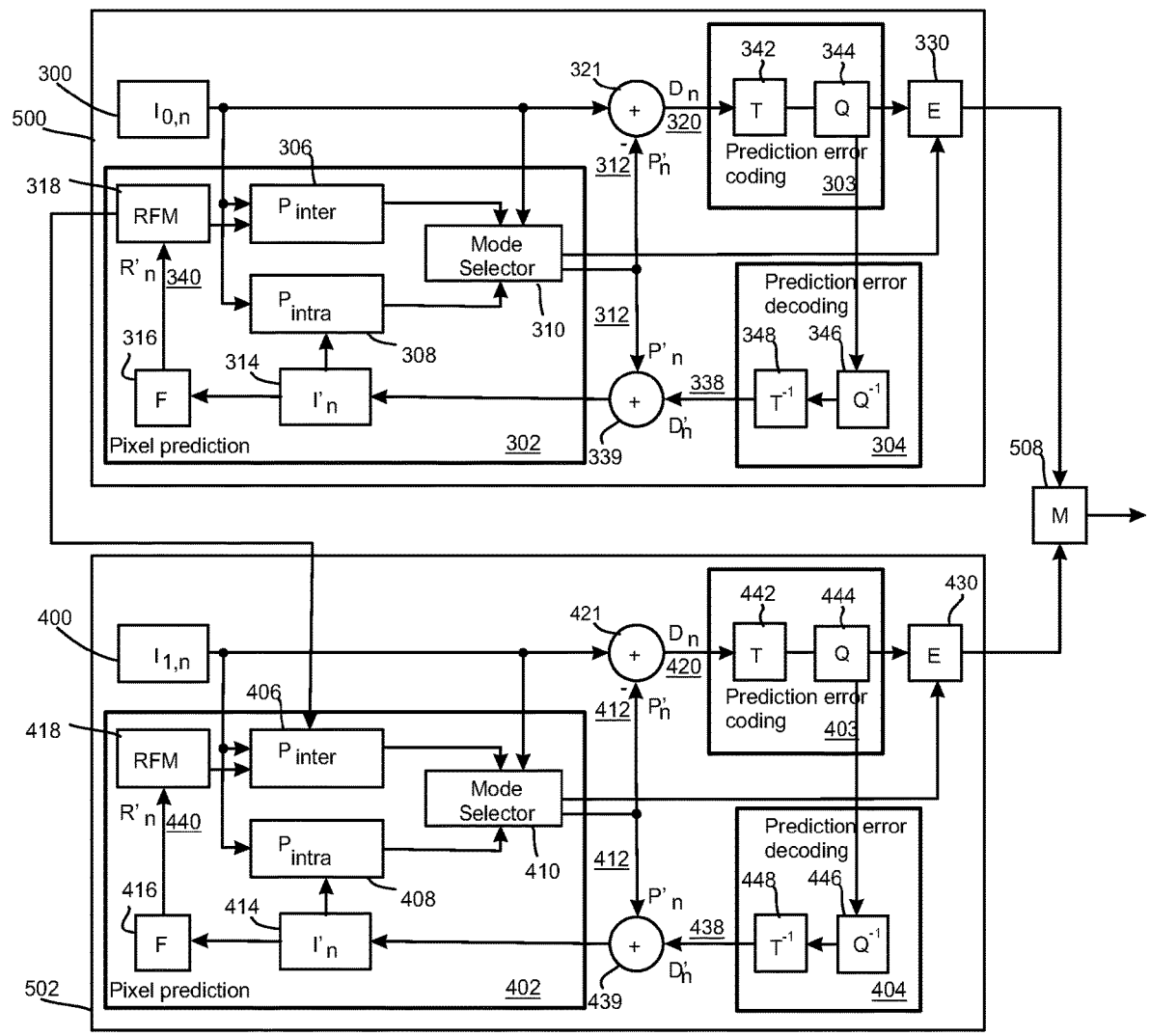
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly simplified to encode only one layer or extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was published as ITU-T Recommendation H.265 (October 2014) and as Edition 2 of ISO/IEC 23008-2. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a tile grid comprising one or more tile columns and one or more tile rows. A coded tile is byte-aligned, which may be achieved by adding byte-alignment bits at the end of the coded tile.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In HEVC, a tile contains an integer number of coding tree units, and may consist of coding tree units contained in more than one slice. Similarly, a slice may consist of coding tree units contained in more than one tile. In HEVC, all coding tree units in a slice belong to the same tile and/or all coding tree units in a tile belong to the same slice. Furthermore, in HEVC, all coding tree units in a slice segment belong to the same tile and/or all coding tree units in a tile belong to the same slice segment.

A motion-constrained tile set is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set.

It is noted that sample locations used in inter prediction are saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

The temporal motion-constrained tile sets SEI message of HEVC can be used to indicate the presence of motion-constrained tile sets in the bitstream.

An inter-layer constrained tile set is such that the inter-layer prediction process is constrained in encoding such that no sample value outside each associated reference tile set, and no sample value at a fractional sample position that is derived using one or more sample values outside each associated reference tile set, is used for inter-layer prediction of any sample within the inter-layer constrained tile set.

The inter-layer constrained tile sets SEI message of HEVC can be used to indicate the presence of inter-layer constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike and/or tiles or alike. In-picture prediction is typically disabled across slice boundaries and tile boundaries. Thus, slices and tiles can be regarded as a way to split a coded picture to independently decodable pieces. In H.264/AVC and HEVC, in-picture prediction may be disabled across slice boundaries, and in HEVC in-picture prediction may be disable across tile boundaries. Thus, slices can be regarded as a way to split a coded picture into independently decodable pieces, and slices are therefore often regarded as elementary units for transmission and can also be used as elementary units for parallelization. Tiles can be regarded as elementary units for parallelization in encoding and/or decoding. In many cases, encoders may indicate in the bitstream which types of in-picture prediction are turned off across slice boundaries or tile boundaries (separately or jointly for slice and tile boundaries), and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A NAL unit may be defined as a syntax structure containing an indication of the type of data to follow and bytes containing that data in the form of an RBSP interspersed as necessary with start code emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0. NAL units consist of a header and payload.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. In H.264/AVC, coded slice NAL units contain syntax elements representing one or more coded macroblocks, each of which corresponds to a block of samples in the uncompressed picture. In HEVC, VCLNAL units contain syntax elements representing one or more CU.

In HEVC, a coded slice NAL unit can be indicated to be one of the following types:

| nal_unit_type | Name of nal_unit_type | Content of NAL unit and RBSP syntax structure |
| --- | --- | --- |
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |

-continued

| nal_unit_type | Name of nal_unit_type | Content of NAL unit and RBSP syntax structure |
|---|---|---|
| 11, 13, 15 | RSV_VCL_R11 RSV_VCL_R13 RSV_VCL_R15 | Reserved // reserved non-RAP reference VCL NAL unit types |
| 16, 17, 18 19, 20 | BLA_W_LP IDR_W_RADL BLA_N_LP IDR_W_RADL IDR_N_LP | Coded slice segment of a BLA picture slice_segment_layer_rbsp( ) Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 ... RSV_IRAP_VCL23 | Reserved // reserved RAP VCL NAL unit types |
| 24 ... 31 | RSV_VCL24 ... RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture.

The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_RADL, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_RADL or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( )syntax structure. The vps_extension( ) syntax structure was specified in HEVC version 2 primarily for multi-layer extensions and comprises syntax elements which may be of use for decoding of one or more non-base layers, such as syntax elements indicating layer dependency relations.

The syntax element max_tid_il_ref_pics_plus1 in the VPS extension can be used to indicate that non-IRAP pictures are not used a reference for inter-layer prediction and, if not so, which temporal sub-layers are not used as a reference for inter-layer prediction: max_tid_il_ref_pics_plus1[i][j] equal to 0 specifies that non-IRAP pictures with nuh_layer_id equal to layer_id_in_nuh[i] are not used as source pictures for inter-layer prediction for pictures with nuh_layer_id equal to layer_id_in_nuh[j]. max_tid_il_ref_pics_plus1[i][j] greater than 0 specifies that pictures with nuh_layer_id equal to layer_id_in_nuh[i] and TemporalId greater than max_tid_il_ref_pics_plus1[i][j]−1 are not used as source pictures for inter-layer prediction for pictures with nuh_layer_id equal to layer_id_in_nuh[j]. When not present, the value of max_tid_il_ref_pics_plus1[i][j] is inferred to be equal to 7.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISOBMFF may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit. An AU typically contains all the coded pictures that represent the same output time and/or capturing time.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A byte stream format has been specified in H.264/AVC and HEVC for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the byte stream format is in use or not. The bit order for the byte stream format may be specified to start with the most significant bit (MSB) of the first byte, proceed to the least significant bit (LSB) of the first byte, followed by the MSB of the second byte, etc. The byte stream format may be considered to consist of a sequence of byte stream NAL unit syntax structures. Each byte stream NAL unit syntax structure may be considered to contain one start code prefix followed by one NAL unit syntax structure, i.e. the nal_unit (NumBytesInNalUnit) syntax structure if syntax element names are referred to. A byte stream NAL unit may also contain an additional zero_byte syntax element. It may also contain one or more additional trailing_zero_8 bits syntax elements. When a byte stream NAL unit is the first byte stream NAL unit in the bitstream, it may also contain one or more additional leading_zero_8 bits syntax elements. The syntax of a byte stream NAL unit may be specified as follows:

|  | Descriptor |
|---|---|
| byte_stream_nal_unit( NumBytesInNalUnit ) { | |
|     while( next_bits( 24 ) != 0x000001 && next_bits( 32 ) != 0x00000001 ) | |
|         leading_zero_8bits /* equal to 0x00 */ | f(8) |
|     if( next_bits( 24 ) != 0x000001 ) | |
|         zero_byte /* equal to 0x00 */ | f(8) |
|     start_code_prefix_one_3bytes /* equal to 0x000001 */ | f(24) |
|     nal_unit( NumBytesInNalUnit ) | |
|     while( more_data_in_byte_stream( ) && next_bits( 24 ) != 0x000001 && | |
|         next_bits( 32 ) != 0x00000001 ) | |
|         trailing_zero_8bits /* equal to 0x00 */ | f(8) |
| } | |

The order of byte stream NAL units in the byte stream may be required to follow the decoding order of the NAL units contained in the byte stream NAL units. The semantics of syntax elements may be specified as follows. leading_zero_8 bits is a byte equal to 0x00. The leading_zero_8 bits syntax element can only be present in the first byte stream NAL unit of the bitstream, because any bytes equal to 0x00 that follow a NAL unit syntax structure and precede the four-byte sequence 0x00000001 (which is to be interpreted as a zero_byte followed by a start_code_prefix_one_3 bytes) will be considered to be trailing_zero_8 bits syntax elements that are part of the preceding byte stream NAL unit. zero_byte is a single byte equal to 0x00. start_code_prefix_one_3 bytes is a fixed-value sequence of 3 bytes equal to 0x000001. This syntax element may be called a start code prefix (or simply a start code). trailing_zero_8 bits is a byte equal to 0x00.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit.

The HEVC syntax of the nal_unit(NumBytesInNalUnit) syntax structure are provided next as an example of a syntax of NAL unit.

to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an

|  | Descriptor |
|---|---|
| nal_unit( NumBytesInNalUnit ) { | |
|     nal_unit_header( ) | |
|     NumBytesInRbsp = 0 | |
|     for( i = 2; i < NumBytesInNalUnit; i++ ) | |
|         if( i + 2 < NumBytesInNalUnit && next_bits( 24 ) = = 0x000003 ) { | |
|             rbsp_byte[ NumBytesInRbsp++ ] | b(8) |
|             rbsp_byte[ NumBytesInRbsp++ ] | b(8) |
|             i += 2 | |
|             emulation_prevention_three_byte /* equal to 0x03 */ | f(8) |
|         } else | |
|             rbsp_byte[ NumBytesInRbsp++ ] | b(8) |
| } | |

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

In HEVC, a reference picture set (RPS) syntax structure and decoding process are used. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement
  layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally. Region of Interest (ROI) coding may be defined to refer to coding a particular region within a video at a higher fidelity.

ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exists several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

The spatial correspondence of a reference-layer picture and an enhancement-layer picture may be inferred or may be indicated with one or more types of so-called reference layer location offsets. In HEVC, reference layer location offsets may be included in the PPS by the encoder and decoded from the PPS by the decoder. Reference layer location offsets may be used for but are not limited to achieving ROI scalability. Reference layer location offsets may comprise one or more of scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region relative to the respective corner samples of the enhancement layer picture. The scaled reference layer offset values may be signed. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offset values may be signed. A resampling phase set may be considered to specify the phase offsets used in resampling process of a source picture for inter-layer prediction. Different phase offsets may be provided for luma and chroma components.

In frame-compatible stereoscopic video (a.k.a. frame packing of stereoscopic video), a spatial packing of a stereo pair into a single frame is performed at the encoder side as a pre-processing step for encoding and then the frame-packed frames are encoded with a conventional 2D video coding scheme. The output frames produced by the decoder contain constituent frames of a stereo pair.

In a typical operation mode, the spatial resolution of the original frames of each view and the packaged single frame have the same resolution. In this case the encoder downsamples the two views of the stereoscopic video before the packing operation. The spatial packing may use for example a side-by-side or top-bottom format, and the downsampling should be performed accordingly.

Frame packing may be preferred over multiview video coding (e.g. MVC extension of H.264/AVC or MV-HEVC extension of H.265/HEVC) for example due to the following reasons:

The post-production workflows might be tailored for a single video signal. Some post-production tools might not be able to handle two separate picture sequences and/or might not be able to keep the separate picture sequences in synchrony with each other.

The distribution system, such as transmission protocols, might be such that support single coded sequence only and/or might not be able to keep separate coded sequences in synchrony with each other and/or may require more buffering or latency to keep the separate coded sequences in synchrony with each other.

The decoding of bitstreams with multiview video coding tools may require support of specific coding modes, which might not be available in players. For example, many smartphones support H.265/HEVC Main profile decoding but are not able to handle H.265/HEVC Multiview Main profile decoding even though it only requires high-level additions compared to the Main profile.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A layer-wise start-up mechanism may generate unavailable pictures for the reference pictures of the first picture in decoding order in a particular enhancement layer. Alternatively, a decoder may omit the decoding of pictures preceding, in decoding order, the IRAP picture from which the decoding of a layer can be started. These pictures that may be omitted may be specifically labeled by the encoder or another entity within the bitstream. For example, one or more specific NAL unit types may be used for them. These pictures, regardless of whether they are specifically marked with a NAL unit type or inferred e.g. by the decoder, may be referred to as cross-layer random access skip (CL-RAS) pictures. The decoder may omit the output of the generated unavailable pictures and the decoded CL-RAS pictures.

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

The types of inter-layer prediction may comprise, but are not limited to, one or more of the following: inter-layer sample prediction, inter-layer motion prediction, inter-layer residual prediction. In inter-layer sample prediction, at least a subset of the reconstructed sample values of a source picture for inter-layer prediction are used as a reference for predicting sample values of the current picture. In inter-layer motion prediction, at least a subset of the motion vectors of a source picture for inter-layer prediction are used as a reference for predicting motion vectors of the current picture. Typically, predicting information on which reference pictures are associated with the motion vectors is also included in inter-layer motion prediction. For example, the reference indices of reference pictures for the motion vectors may be inter-layer predicted and/or the picture order count or any other identification of a reference picture may be inter-layer predicted. In some cases, inter-layer motion prediction may also comprise prediction of block coding mode, header information, block partitioning, and/or other similar parameters. In some cases, coding parameter prediction, such as inter-layer prediction of block partitioning, may be regarded as another type of inter-layer prediction. In inter-layer residual prediction, the prediction error or residual of selected blocks of a source picture for inter-layer prediction is used for predicting the current picture. In multiview-plus-depth coding, such as 3D-HEVC, cross-component inter-layer prediction may be applied, in which a picture of a first type, such as a depth picture, may affect the inter-layer prediction of a picture of a second type, such as a conventional texture picture. For example, disparity-compensated inter-layer sample value and/or motion prediction may be applied, where the disparity may be at least partially derived from a depth picture.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

A source picture for inter-layer prediction may be defined as a decoded picture that either is, or is used in deriving, an inter-layer reference picture that may be used as a reference picture for prediction of the current picture. In multi-layer HEVC extensions, an inter-layer reference picture is included in an inter-layer reference picture set of the current picture. An inter-layer reference picture may be defined as a reference picture that may be used for inter-layer prediction of the current picture. In the coding and/or decoding process, the inter-layer reference pictures may be treated as long term reference pictures.

A source picture for inter-layer prediction may be required to be in the same access unit as the current picture. In some cases, e.g. when no resampling, motion field mapping or other inter-layer processing is needed, the source picture for inter-layer prediction and the respective inter-layer reference picture may be identical. In some cases, e.g. when resampling is needed to match the sampling grid of the reference layer to the sampling grid of the layer of the current picture (being encoded or decoded), inter-layer processing is applied to derive an inter-layer reference picture from the source picture for inter-layer prediction. Examples of such inter-layer processing are described in the next paragraphs.

Inter-layer sample prediction may be comprise resampling of the sample array(s) of the source picture for inter-layer prediction. The encoder and/or the decoder may derive a horizontal scale factor (e.g. stored in variable ScaleFactorX) and a vertical scale factor (e.g. stored in variable ScaleFactorY) for a pair of an enhancement layer and its reference layer for example based on the reference layer location offsets for the pair. If either or both scale factors are not equal to 1, the source picture for inter-layer prediction may be resampled to generate an inter-layer reference picture for predicting the enhancement layer picture. The process and/or the filter used for resampling may be pre-defined for example in a coding standard and/or indicated by the encoder in the bitstream (e.g. as an index among pre-defined resampling processes or filters) and/or decoded by the decoder from the bitstream. A different resampling process may be indicated by the encoder and/or decoded by the decoder and/or inferred by the encoder and/or the decoder depending on the values of the scale factor. For example, when both scale factors are less than 1, a pre-defined downsampling process may be inferred; and when both scale factors are greater than 1, a pre-defined upsampling process may be inferred. Additionally or alternatively, a different resampling process may be indicated by the encoder and/or decoded by the decoder and/or inferred by the encoder and/or the decoder depending on which sample array is processed. For example, a first resampling process may be inferred to be used for luma sample arrays and a second resampling process may be inferred to be used for chroma sample arrays.

SHVC enables the use of weighted prediction or a color-mapping process based on a 3D lookup table (LUT) for (but not limited to) color gamut scalability. The 3D LUT approach may be described as follows. The sample value range of each color components may be first split into two ranges, forming up to 2×2×2 octants, and then the luma ranges can be further split up to four parts, resulting into up to 8×2×2 octants. Within each octant, a cross color component linear model is applied to perform color mapping. For each octant, four vertices are encoded into and/or decoded from the bitstream to represent a linear model within the octant. The color-mapping table is encoded into and/or decoded from the bitstream separately for each color component. Color mapping may be considered to involve three steps: First, the octant to which a given reference-layer sample triplet (Y, Cb, Cr) belongs is determined. Second, the sample locations of luma and chroma may be aligned through applying a color component adjustment process. Third, the linear mapping specified for the determined octant is applied. The mapping may have cross-component nature, i.e. an input value of one color component may affect the mapped value of another color component. Additionally, if inter-layer resampling is also required, the input to the resampling process is the picture that has been color-mapped. The color-mapping may (but needs not to) map samples of a first bit-depth to samples of another bit-depth.

Inter-layer motion prediction may be realized as follows. A temporal motion vector prediction process, such as TMVP of H.265/HEVC, may be used to exploit the redundancy of motion data between different layers. This may be done as follows: when the decoded base-layer picture is upsampled, the motion data of the base-layer picture is also mapped to the resolution of an enhancement layer. If the enhancement layer picture utilizes motion vector prediction from the base layer picture e.g. with a temporal motion vector prediction mechanism such as TMVP of H.265/HEVC, the corresponding motion vector predictor is originated from the mapped base-layer motion field. This way the correlation between the motion data of different layers may be exploited to improve the coding efficiency of a scalable video coder. In SHVC and/or alike, inter-layer motion prediction may be performed by setting the inter-layer reference picture as the collocated reference picture for TMVP derivation.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A coding standard or system may refer to a term operation point or alike, which may indicate the scalable layers and/or sub-layers under which the decoding operates and/or may be associated with a sub-bitstream that includes the scalable layers and/or sub-layers being decoded. In HEVC, an operation point is defined as bitstream created from another bitstream by operation of the sub-bitstream extraction process with the another bitstream, a target highest TemporalId, and a target layer identifier list as inputs.

The VPS of HEVC specifies layer sets and HRD parameters for these layer sets. A layer set may be used as the target layer identifier list in the sub-bitstream extraction process. In HEVC, a layer set may be defined as set of layers represented within a bitstream created from another bitstream by operation of the sub-bitstream extraction process with the another bitstream, the target highest TemporalId equal to 6, and the target layer identifier list equal to the layer identifier list associated with the layer set as inputs.

An output layer may be defined as a layer whose decoded pictures are output by the decoding process. The output layers may depend on which subset of the multi-layer bitstream is decoded. The pictures output by the decoding process may be further processed, e.g. a color space conversion from the YUV color space to RGB may be performed, and they may be displayed. However, further processing and/or displaying may be considered to be processes external of the decoder and/or the decoding process and might not take place.

In multi-layer video bitstreams, an operation point definition may include a consideration a target output layer set. For example, an operation point may be defined as a bitstream that is created from another bitstream by operation of the sub-bitstream extraction process with the another bitstream, a target highest temporal sub-layer (e.g. a target highest TemporalId), and a target layer identifier list as inputs, and that is associated with a set of output layers. Alternatively, another term, such as an output operation point, may be used when referring to an operation point and the associated set of output layers. For example, in MV-HEVC/SHVC, an output operation point may be defined as a bitstream that is created from an input bitstream by operation of the sub-bitstream extraction process with the input bitstream, a target highest TemporalId, and a target layer identifier list as inputs, and that is associated with a set of output layers.

An output layer set (OLS) may be defined as a set of layers consisting of the layers of one of the specified layer sets, where one or more layers in the set of layers are indicated to be output layers. An output layer may be defined as a layer of an output layer set that is output when the decoder and/or the HRD operates using the output layer set as the target output layer set. In MV-HEVC/SHVC, the variable TargetOlsIdx may specify which output layer set is the target output layer set by setting TargetOlsIdx equal to the index of the output layer set that is the target output layer set. A target output layer set may be defined as the output layer set for which the index is equal to TargetOlsIdx. TargetOlsIdxmay be set for example by the HRD and/or may be set by external means, for example by a player or alike through an interface provided by the decoder. In MV-HEVC/SHVC, an output layer may be defined as a layer of an output layer set that is output when TargetOlsIdx is equal to the index of the output layer set.

A sender, a gateway, a client, or alike may select the transmitted layers and/or sub-layers of a scalable video bitstream. Terms layer extraction, extraction of layers, or layer down-switching may refer to transmitting fewer layers than what is available in the bitstream received by the sender, gateway, client, or alike. Layer up-switching may refer to transmitting additional layer(s) compared to those transmitted prior to the layer up-switching by the sender, gateway, client, or alike, i.e. restarting the transmission of one or more layers whose transmission was ceased earlier in layer down-switching. Similarly to layer down-switching and/or up-switching, the sender, gateway, client, or alike may perform down- and/or up-switching of temporal sub-layers. The sender, gateway client, or alike may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

While a constant set of output layers suits well use cases and bitstreams where the highest layer stays unchanged in each access unit, they may not support use cases where the highest layer changes from one access unit to another. It has therefore been proposed that encoders can specify the use of alternative output layers within the bitstream and in response to the specified use of alternative output layers decoders output a decoded picture from an alternative output layer in the absence of a picture in an output layer within the same access unit. Several possibilities exist how to indicate alternative output layers. For example, as specified in HEVC, the alternative output layer set mechanism may be constrained to be used only for output layer sets containing only one output layer, and an output-layer-set-wise flag (alt_output_layer_flag[olsIdx] in HEVC) may be used for specifying that any direct or indirect reference layer of the output layer may serve as an alternative output layer for the output layer of the output layer set. When more than one alternative output layer is enabled to be used, it may be specified that the first direct or indirect inter-layer reference picture present in the access unit in descending layer identifier order down to the indicated minimum alternative output layer is output.

A sample in according to the sample entry codes defined presently in ISO/IEC 14496-15 (e.g. 'hvc1', 'hev1') consists of a sequence of NAL units without start code, each prefixed by their byte count. The length of the byte count field can be indicated in the sample entry.

Internet media types, also known as MIME (Multipurpose Internet Mail Extension) types, are used by various applications to identify the type of a resource or a file. MIME types consist of a media type, a subtype, and zero or more optional parameters.

As described, MIME is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can indicate different media formats. Content type information may be included by a transmitting entity in a MIME header at the beginning of a media transmission. A receiving entity thus may need to examine the details of such media content to determine if the specific elements can be rendered given an available set of codecs. Especially, when the end system has limited resources, or the connection to the end systems has limited bandwidth, it may be helpful to know from the content type alone if the content can be rendered.

Two parameters, 'codecs' and 'profiles', are specified to be used with various MIME types or type/subtype combinations to allow for unambiguous specification of the codecs employed by the media formats contained within, or the profile(s) of the overall container format.

By labelling content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.). For file formats derived from the ISOBMFF, the codecs parameter may be considered to comprise a comma-separated list of one or more list items. When a list item of the codecs parameter represents a track of an ISOBMFF compliant file, the list item may comprise a four-character code of the sample entry of the track. A list item may additionally indicate the coding profile (e.g. HEVC Main profile) to which the bitstream contained by the samples of the track conform.

The profiles MIME parameter can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. The profiles parameter for an ISOBMFF file may be specified to comprise a list of the compatible brands included in the file.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)—Part 1: Media presentation description and segment formats," International Standard, $2^{nd}$ Edition, 2014). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 5:
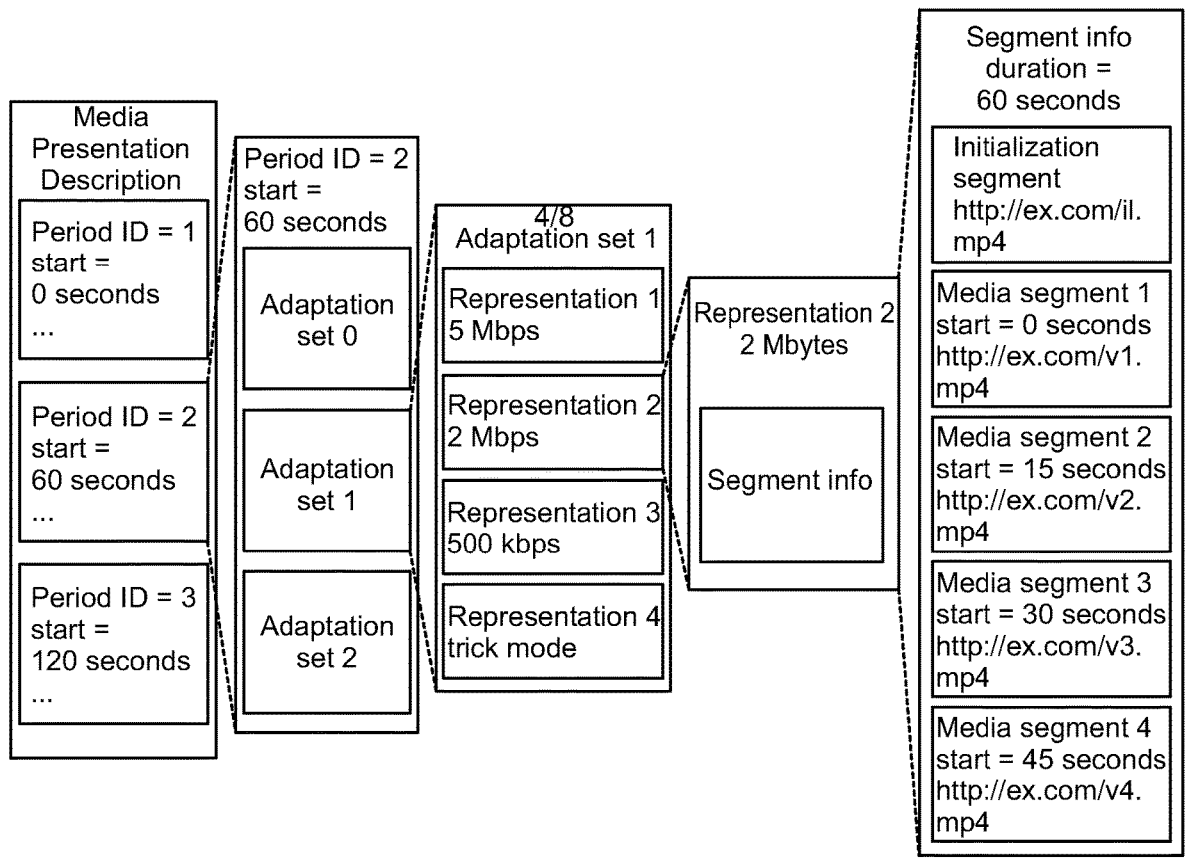
FIG. 5 shows an example of a hierarchical data model used in DASH.

In DASH, hierarchical data model is used to structure media presentation as shown in FIG. 5. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (e.g., codec, sampling rate, etc.), an embedded sub-title (e.g., codec) or it may describe some embedded lower quality video layer (e.g. some lower frame rate, etc.). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:
  The Initialization Segment contains the Level Assignment box.
  The Subsegment Index box ('ssix') is present for each Subsegment.
  The attribute @level specifies the level to which the described Sub-Representation is associated to in the Subsegment Index. The information in Representation, Sub-Representation and in the Level Assignment ('leva') box contains information on the assignment of media data to levels.
  Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., temporal_id of SVC or MVC or TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction shall be assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to the a particular temporal level using the Temporal Level sample grouping (and the same can be repeated for all TemporalId values). The Level Assignment box can then refer to the Temporal Level sample grouping in the indicated mapping to levels. The Level Assignment box includes the syntax element padding flag. padding_flag is equal to 1 indicates that a conforming fraction can be formed by concatenating any positive integer number of levels within a fraction and padding the last Media Data box by zero bytes up to the full size that is indicated in the header of the last Media Data box. For example, padding_flag can be set equal to 1 when each fraction contains two or more AVC, SVC, or MVC tracks of the same video bitstream, the samples for each track of a fraction are contiguous and in decoding order in a Media Data box, and the samples of the first AVC, SVC, or MVC level contain extractor NAL units for including the video coding NAL units from the other levels of the same fraction.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken It may be required that for any dependent Representation X that depends on complementary Representation Y, the m-th Subsegment of X and the n-th Subsegment of Y shall be non-overlapping whenever m is not equal to n. It may be required that for dependent Representations the concatenation of the Initialization Segment with the sequence of Subsegments of the dependent Representations, each being preceded by the corresponding Subsegment of each of the complementary Representations in order as provided in the @dependencyId attribute shall represent a conforming Subsegment sequence conforming to the media format as specified in the @mimeType attribute for this dependent Representation.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

SRD is specified in the normative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

To preserve the compatibility with legacy clients, MPD is required to use SupplementalProperty and EssentialProperty in such a way that at least one Representation can be interpreted by legacy clients after discarding the element containing EssentialProperty.

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

A specific projection for mapping a panoramic image covering 360-degree field-of-view horizontally and 180-degree field-of-view vertically (hence representing a sphere) to a rectangular two-dimensional image plane is known as equirectangular projection. In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic may have less than 360-degree horizontal field-of-view and up to 180-degree vertical field-of-view, while otherwise have the characteristics of equirectangular projection format.

A panorama, such as an equirectangular panorama, can be stereoscopic. In a stereoscopic panorama format, one panorama picture may represent the left view and the other panorama picture (of the same time instant or access unit) may represent the right view. When a stereoscopic panorama is displayed on a stereoscopic display arrangement, such as a virtual reality headset, the left-view panorama may be displayed in appropriate viewing angle and field of view to the left eye, and the right-view panorama may be similarly displayed to the right eye. In a stereoscopic panorama, the stereoscopic viewing may be assumed to happen towards the equator (i.e. vertically the center-most pixel row) of the panorama, causing that greater the absolute inclination of the viewing angle, the worse the correctness of the stereoscopic three-dimensional presentation.

In cubemap projection format, spherical video is projected onto the six faces (a.k.a. sides) of a cube. The cubemap may be generated e.g. by first rendering the spherical scene six times from a viewpoint, with the views defined by an 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

A cubemap can be stereoscopic. A stereoscopic cubemap can e.g. be reached by re-projecting each view of a stereoscopic panorama to the cubemap format.

In many displaying situations only a partial picture is needed to be displayed while the remaining picture is required to be decoded but is not displayed. These displaying situations include:

Typical head-mounted displays (HMDs) display ~100 degrees field of view, while often the input video for HMD consumption covers entire 360 degrees.

Typical flat-panel viewing environments display up to 40-degree field-of-view. When displaying wide-FOV content (e.g. fisheye) on such a display, it may be preferred to display a spatial subset rather than the entire picture.

Now in order to at least alleviate the above disadvantages, a method for enabling standard-compliant decoding for motion-constrained tile sets is presented hereinafter.

Figure 6A:
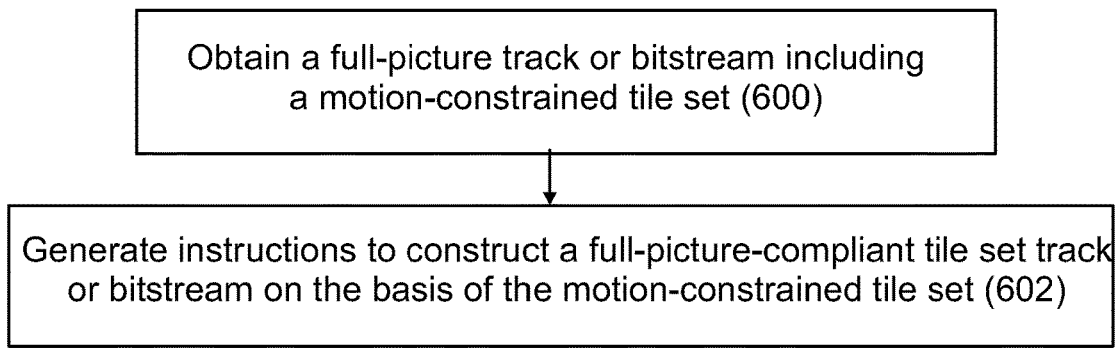
FIGS. 6a and 6b shows flow charts of generating instructions for constructing a bitstream and constructing a bitstream according to embodiments of the invention.

In the method, which is depicted in FIG. 6a, a full-picture track or bitstream including a motion-constrained tile set is obtained (600), and on the basis of the motion-constrained tile set, instructions to construct a full-picture-compliant tile set track or bitstream are generated (602). The method can be carried out by a file generator (e.g. 1530 or 1570 of FIG. 23).

Figure 6B:
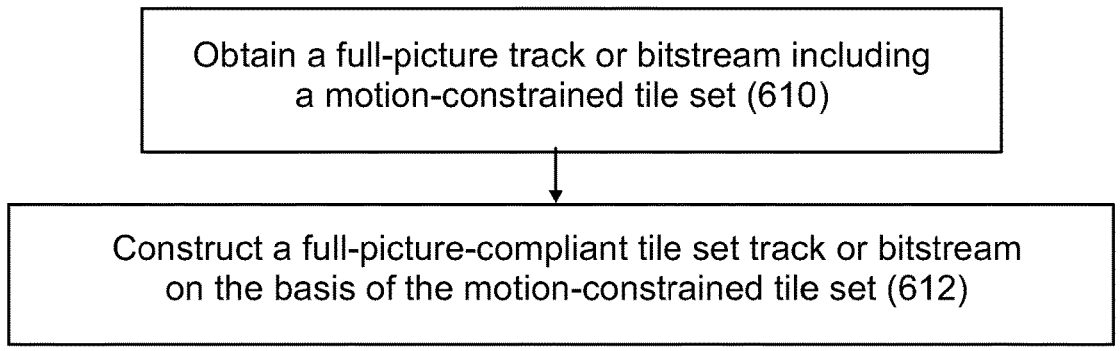

In the method, as disclosed in FIG. 6b, a full-picture track or bitstream including a motion-constrained tile set is obtained (610), and on the basis of the motion-constrained tile set, a full-picture-compliant tile set track or bitstream is constructed (612). The method may be carried out by a file parser (e.g. 1580 of FIG. 23) or a player prior to decoding, or by a streaming server (e.g. 1540 of FIG. 23).

Figure 7:
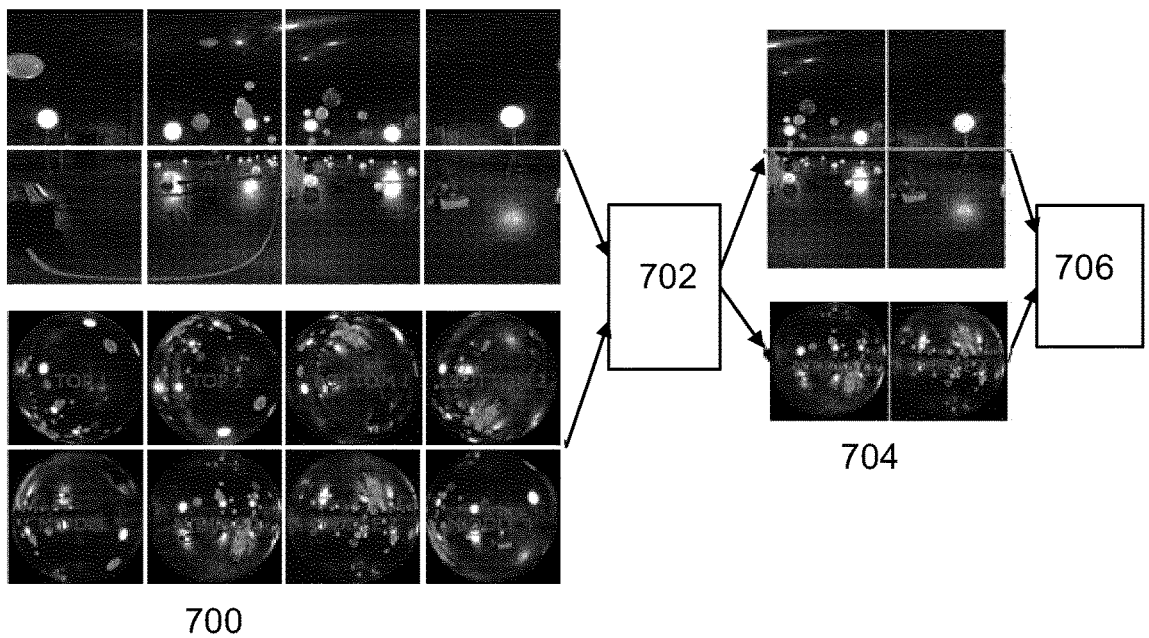
FIG. 7 shows a basic concept underlying various embodiments of the invention.

FIG. 7 shows an example of the concept underlying the embodiments. As an input for the method, a bitstream 700 is obtained that contains one or more motion-constrained tile sets. For example, either an equirectangular panorama video sequence (700, at the top) or a frame-packed fisheye multiview sequence (700, at the bottom) may be used as input. A motion-constrained tile set is a rectangular set of tiles that may contain one or more tiles. In FIG. 7, the white rectangles illustrate the tile boundaries. The encoding of a motion-constrained tile set is done in a manner that the inter prediction process is constrained such that no sample value outside the motion-constrained tile set, and no sample value at a fractional sample position that is derived using one or more sample values outside the motion-constrained tile set, is used for inter prediction of any sample within the motion-constrained tile set.

Then, in 702, a subset of the motion-constrained tiles is selected for constructing or generating instructions to construct a full-picture-compliant tile set track or bitstream from a motion-constrained tile set of the input bitstream. When constructing a full-picture-compliant tile set track or bitstream, step 702 may be done e.g. in a streaming server (e.g. 1540 of FIG. 23), while or prior to streaming, or in a file parser (e.g. 1580 of FIG. 23) or a player, prior to decoding. When generating instructions to construct a full-picture-compliant tile set track or bitstream, step 702 may be done e.g. by a file generator (e.g. 1530 or 1570 of FIG. 23). The output of the method is a full-picture-compliant tile set track 704 or bitstream constructed on the basis of the motion-constrained tile set, wherein the full-picture-compliant tile set track or bitstream is decodable, as such, by a standard video decoder 706, such as H.265/HEVC decoder. Alternatively, the output may be instructions to construct a full-picture-compliant tile set track or bitstream constructed on the basis of the motion-constrained tile set.

Figure 8:
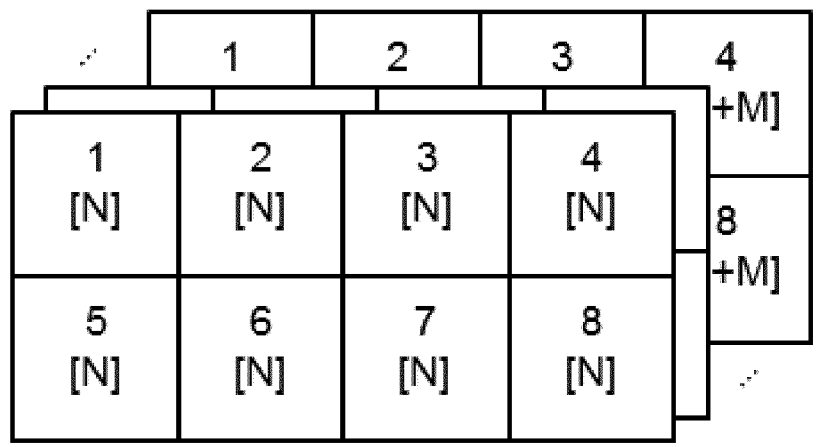
FIG. 8 shows an example of a division of motion-constrained tile sets.

Some examples are illustrated with (but not limited to) the division of motion-constrained tile sets shown in FIG. 8. In FIG. 8, the value 1 . . . 8 indicates the position of the tile set. The value in square brackets indicates the picture containing the tile set. In some embodiments, a segment or a subsegment includes pictures N to N+M, inclusive, and excludes other pictures.

Figure 9:
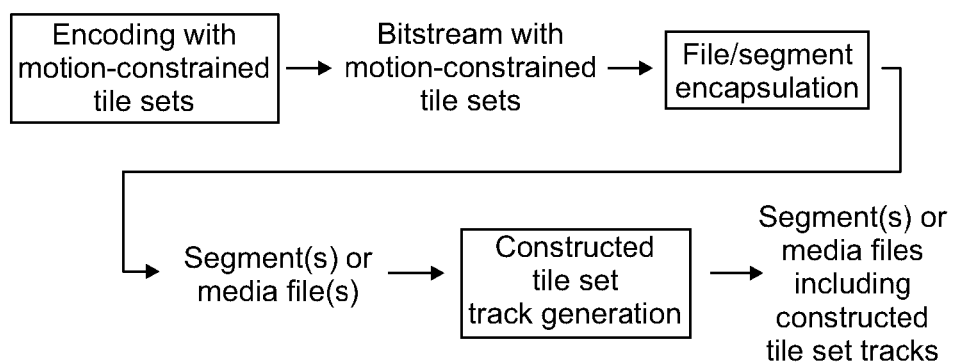
FIG. 9 shows a process of generating instructions for constructing a full-picture compliant tile set track according to an embodiment.

FIG. 9 illustrates a process including the generation of instructions to construct a full-picture-compliant tile set track. In "File/segment encapsulation", the bitstream with motion-constrained tile set(s) is encapsulated into a container file or segment(s) (e.g. for DASH delivery). In "Constructed tile set track generation", a constructed tile set track is generated with reference to a track containing the motion-constrained tile set in the container file or segment(s).

Figure 10:
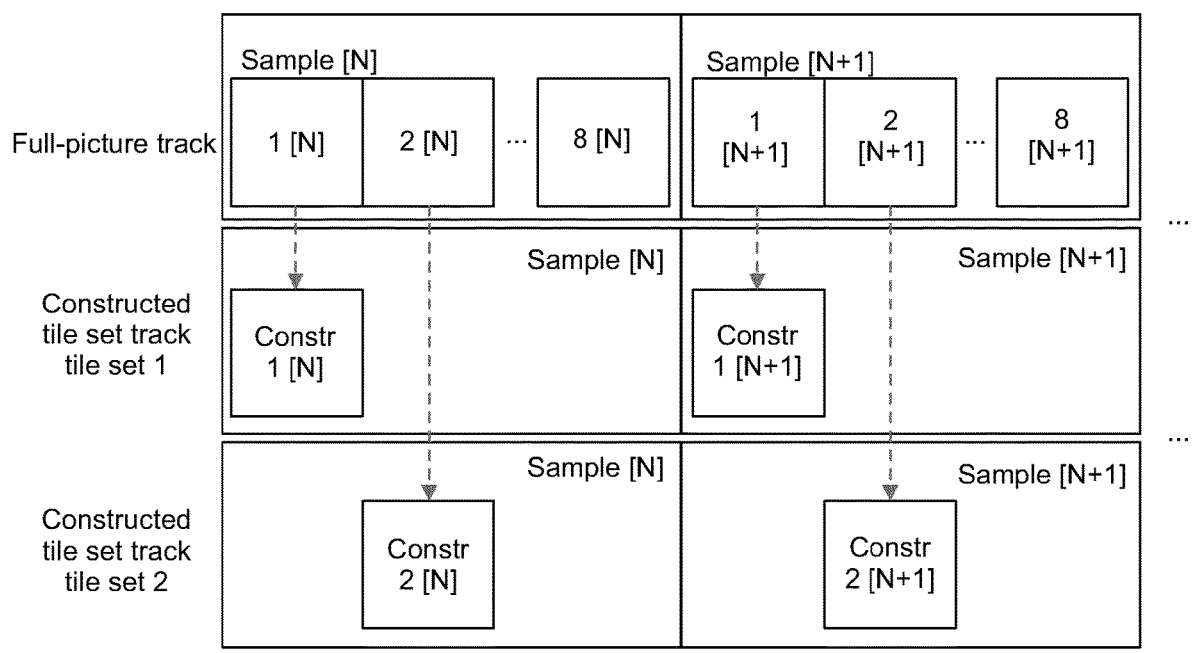
FIG. 10 shows an example of a file structure according to an embodiment.

The result of the process above may be illustrated (with reference but not limited to ISOBMFF) with the logical file structure shown in FIG. 10 containing a full-picture track and one or more constructed tile set tracks. The one or more constructed tile set tracks are created by including samples by reference according to the constructor operators from the full-picture track.

Figure 11A:
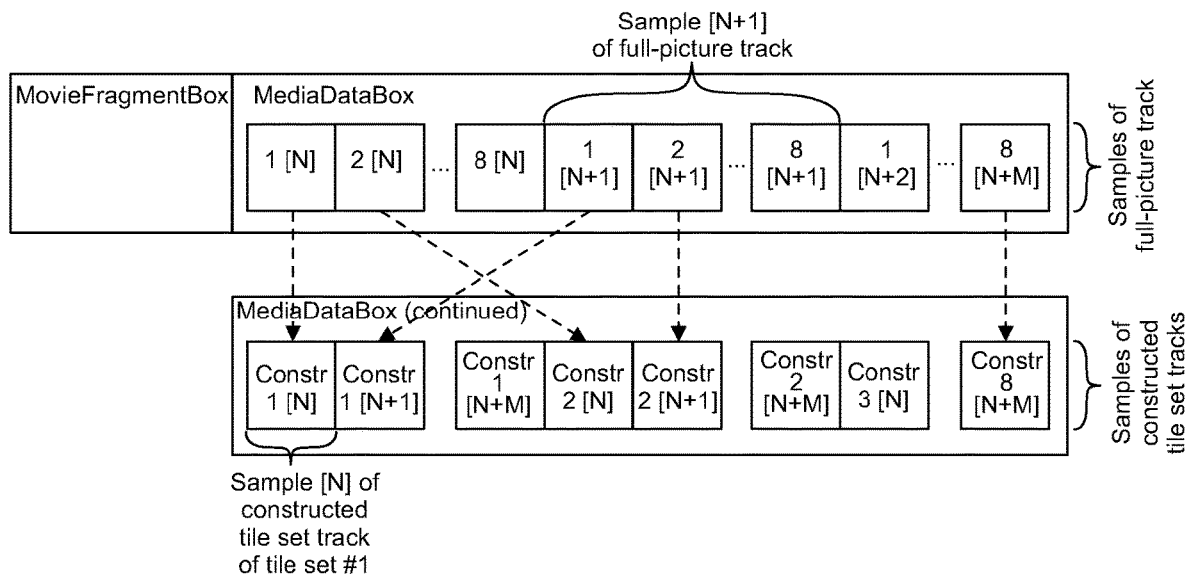
FIGS. 11a and 11b show an example of arranging data chunks of different tracks in a file according to an embodiment, and an example of a constructor operator according to an embodiment.

The sample data for the tracks may be physically arranged in chunks or track runs within the file. For example, (M+1) samples starting from sample N in each track may be a chunk or track run that is not interleaved by data of any other chunk or track run, respectively. These chunks or track run, respectively of different tracks may for example be ordered consecutively in the file. This is illustrated (with reference but not limited to ISOBMFF) in FIG. 11a.

Figure 11B:
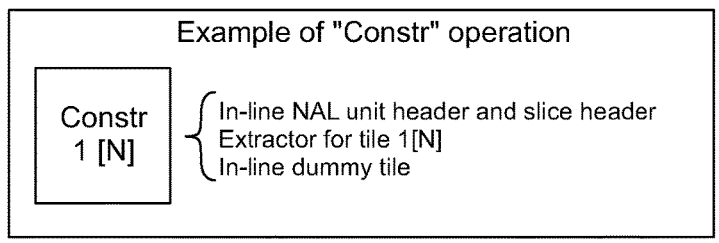

The operation "Constr" stands for the instructions to construct a file format sample. "Constr" may for example contain one or more NAL-unit-like structures, each of which results into one NAL unit into the file format sample. FIG. 11b shows an example of a constructor operator for a VCL NAL unit.

In this description, when explaining the various embodiments, the following terms and their definitions may be used.

A constructed tile set track is tile set track, e.g. a track according to ISOBMFF, containing constructors that, when executed, result into a tile set bitstream.

A constructor is a set of instructions that, when executed, results into a valid piece of sample data according to the underlying sample format.

An extractor is a constructor that, when executed, copies the sample data of an indicated byte range of an indicated sample of an indicated track. Inclusion by reference may be defined as an extractor or alike that, when executed, copies the sample data of an indicated byte range of an indicated sample of an indicated track.

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams.

A full-picture track is a track representing an original bitstream (including all its tiles).

An in-line constructor is a constructor that, when executed, returns the sample data that it contains. For example, an in-line constructor may comprise a set of instructions for rewriting a new slice header. The phrase in-line may be used to indicate coded data that is included in the sample of a track.

A NAL-unit-like structure refers to a structure with the properties of a NAL unit except that start code emulation prevention is not performed.

A pre-constructed tile set track is a tile set track containing the sample data in-line.

A tile set bitstream is a bitstream that contains a tile set of an original bitstream but not representing the entire original bitstream.

A tile set track is a track representing a tile set of an original bitstream but not representing the entire original bitstream.

Various embodiments relating to the tile set bitstream construction or the generation of the constructed tile set tracks comprising instructions to construct a tile set bitstream are described herein below. The embodiments are especially applicable, but not limited, to HEVC.

In an embodiment, the coded data for the motion-constrained tile set is extracted from the full-picture bitstream, and a tile column is added on the right of the extracted motion-constrained tile set. This added tile column may be referred to as the dummy tile column.

In an embodiment, the coded data for the motion-constrained tile set is extracted from the full-picture bitstream, and a tile row is added below the extracted motion-constrained tile set. This added tile row may be referred to as the dummy tile row. This embodiment may be used e.g. when the width of the motion-constrained tile set is equal to the width of the full-picture bitstream or when all tiles of the motion-constrained tile set are in the same slice segment.

In an embodiment, the dummy tile column or the dummy tile row is indicated to be excluded from an output picture of decoding. For example, the conformance cropping window (as specified in HEVC) or alike included e.g. in a sequence level data, such as the sequence parameter set, may be used to exclude the dummy tile column or the dummy tile row, and to include the extracted motion-constrained tile set.

In an embodiment, tiles in the dummy tile column or the dummy tile row are used in indicating whether or not the dummy tile ends a slice segment.

In an embodiment including dummy tile column addition, each dummy tile is generated in a manner that it ends a slice segment. A slice segment header is added before the first (i.e. left-most) tile of the next tile row in the motion-constrained tile set.

In an embodiment including dummy tile column addition, a dummy tile is generated in a manner that it ends a slice segment, when the dummy tile is the last tile, in decoding order, of the constructed picture, or when the first (i.e. left-most) tile of the next tile row in the motion-constrained tile set is included in a different slice segment than the right-most tile of the present tile row in the motion-constrained tile set. Otherwise, a dummy tile is generated in a manner that it does not end a slice segment.

In an embodiment including dummy tile column addition, slice segment header(s) of the slice segment(s) including tiles of the motion-constrained tile set may be investigated. If the slice segment header(s) are, through investigation or through other means (e.g. pre-defined constraints), found to be essentially identical, a constructed picture is generated in a manner that it includes a slice segment header only at the beginning, the dummy tile that is the last, in decoding order, in the constructed picture is generated in a manner that it ends a slice segment, and other dummy tiles are generated in a manner that they do not end a slice segment.

In an embodiment including dummy tile row addition, the dummy tile that is the last, in decoding order, in the constructed picture is generated in a manner that it ends a slice segment, and other dummy tiles are generated in a manner that they do not end a slice segment.

The syntax structure of slice_segment_data( ) of HEVC is specified as follows, with ae(v) indicating a syntax element coded with arithmetic coding, i.e. in HEVC, the context-adaptive binary arithmetic coding (CABAC):

```
                                                                    Descriptor
slice_segment_data( ) {
    do {
        coding_tree_unit( )
        end_of_slice_segment_flag                                   ae(v)
        CtbAddrInTs++
        CtbAddrInRs = CtbAddrInTsToRs[ CtbAddrInTs ]
        if( !end_of_slice_segment_flag &&
            ( ( tiles_enabled_flag && TileId[ CtbAddrInTs ] != TileId[ CtbAddrInTs − 1 ] ) | |
              ( entropy_coding_sync_enabled_flag &&
                ( CtbAddrInTs % PicWidthInCtbsY = = 0 | |
                  TileId[ CtbAddrInTs ] != TileId[ CtbAddrRsToTs[ CtbAddrInRs − 1 ] ] ) ) )
        ) {
            end_of_subset_one_bit /* equal to 1 */                  ae(v)
            byte_alignment( )
        }
    } while( !end_of_slice_segment_flag )
}
```

In an embodiment applicable to HEVC or similar syntax, a dummy tile that ends a slice segment is generated by setting end_of_slice_segment_flag equal to 1 after the last CTU, in decoding order, of the dummy tile. A dummy tile that does not end a slice segment is generated by setting end_of_slice_segment_flag equal to 0 (and end_of_subset_one_bit equal to 1, as indicated in the syntax above).

In an embodiment, the width of a dummy tile column is set equal to one CTU. In an embodiment, the height of a dummy tile row is set equal to one CTU.

In an embodiment, a dummy tile is encoded in a manner that is efficient in compression. For example, coding units of a dummy tile can be coded without prediction error data being present. A largest possible CU size can be used; e.g. in HEVC split_cu_flag[ ][ ] can be set equal to 0 in dummy tiles. For intra-coded HEVC dummy tiles, rqt_root_cbf can be set equal to 0 (assuming that PCM mode is not in use). For inter-coded HEVC dummy tiles, cu_skip_flag[ ][ ] can be set equal to 1.

Various embodiments relating to the tile set bitstream construction from full-picture bitstream with rewriting of the tail of a tile (i.e. a number of bytes starting from the end of the tile towards the start of the tile) are described herein below.

In an embodiment, the set of tiles consists of the right-most tiles of a motion-constrained tile set that has a width less than the picture width of the full-picture bitstream. Each said right-most tile is set to end a slice segment in the tile set bitstream. A slice segment header is added before the first (i.e. left-most) tile of the next tile row in the motion-constrained tile set.

In an embodiment, the set of tiles consists of one tile per each slice segment containing tiles of the motion-constrained tile set, where that one tile is the last tile, in decoding order within the motion-constrained tile set, of the corresponding slice segment. Each tile in the set of tiles is set to end a slice segment in the tile set bitstream, and if a next tile in the motion-constrained tile set follows, a slice segment header is added.

In an embodiment, slice segment header(s) of the slice segment(s) including tiles of the motion-constrained tile set may be investigated. If the slice segment header(s) are, through investigation or through other means (e.g. pre-defined constraints), found to be essentially identical, a constructed picture is generated in a manner that it includes a slice segment header only at the beginning. For tiles excluding the last tile of the motion-constrained tile set, it is indicated that the slice segment does not end, and for the last tile of the motion-constrained tile set, it is indicated that the slice segment ends.

Various embodiments relating to the tile set track construction with rewriting of the tail of a tile are described herein below.

In an embodiment, two versions of a tile are encoded, which are otherwise identical but a first version ends a slice segment (or a slice, in some embodiments) and a second version does not end a slice segment (or a slice, in some embodiments). A version that suits the purpose of the full-picture bitstream is included in the full-picture bitstream. It is concluded whether the same or the other version suits the purpose of a tile set bitstream, e.g. as described above. In the case that the same version suits the purpose of the tile set bitstream, the tile is included by reference in the tile set track. In the case that the other version suits the purpose of the tile set bitstream, the tile of the full-picture bitstream is included by reference in the tile set track, excluding the tail of the tile (e.g. the last byte) where the end of the slice segment is indicated differently. The tail of the tile is included in-line in the tile set track.

In an embodiment, the full-picture bitstream is partly or fully entropy-decoded (e.g. as described above) and it is concluded if the indication of an end of a slice segment has a correct value for the purpose of the tile set bitstream (e.g. as described above). In the case that an end of a slice segment has a correct value for the purpose of the tile set bitstream, the tile is included by reference in the tile set track. In the case that an end of a slice segment does not have a correct value for the purpose of the tile set bitstream, the tile of the full-picture bitstream is included by reference in the tile set track, excluding the tail of the tile (e.g. the last byte). The tile is fully or partly entropy-encoded with a changed indicated of the end of the slice segment (e.g. as described above) and the tail of the entropy-encoded tile is included in-line in the tile set track.

As mentioned above, when using the byte stream format for transmitting or storing video data (as specified e.g. in H.264/AVC or in HEVC), start code emulation and start code emulation prevention handling shall be taken into account.

When constructing a tile set bitstream from tiles that are non-consecutive in the full-picture bitstream or when adding data into the tile set bitstream that was not present in the full-picture bitstream (e.g. adding slice segment headers), start code emulation may occur. Hence, care should be taken to include start code emulation prevention means in these cases.

When constructing a tile set bitstream from tiles that are non-consecutive in the full-picture bitstream or when adding data into the tile set bitstream that was not present in the full-picture bitstream (e.g. adding slice segment headers), a false start code emulation prevention syntax element may occur. When a sequence of three bytes in the tile set bitstream contains bytes from different origin (e.g. non-consecutive tiles) and is equal to 0x000003 in the HEVC case or, more generally, equal to a start code emulation prevention byte value pattern, a decoder falsely concludes that the last byte of the three bytes is an emulation prevention byte. Hence, care should be taken to avoid false start code emulation prevention means in these cases.

In an embodiment, the start code emulation prevention syntax elements (e.g. emulation_prevention_three_byte syntax elements in HEVC) are removed from the coded video data (e.g. VCL NAL units in HEVC) of the full-picture bitstream, resulting into a processed full-picture bitstream. An intermediate tile set bitstream is then constructed from the processed full-picture bitstream, e.g. as described in other embodiments. Start code emulation prevention syntax elements are added to the intermediate tile set bitstream to form the tile set bitstream.

In an embodiment, it is analyzed whether any two or more pieces of consecutive data from different origin in the to-be-constructed tile set bitstream form a start code or a false start code emulation prevention, in which case start code emulation prevention is added into the tile set bitstream.

In an embodiment, start code emulation prevention syntax that is needed to be added in the tile set bitstream, as concluded by above embodiment(s), is included in-line in a tile se track.

Figure 12:
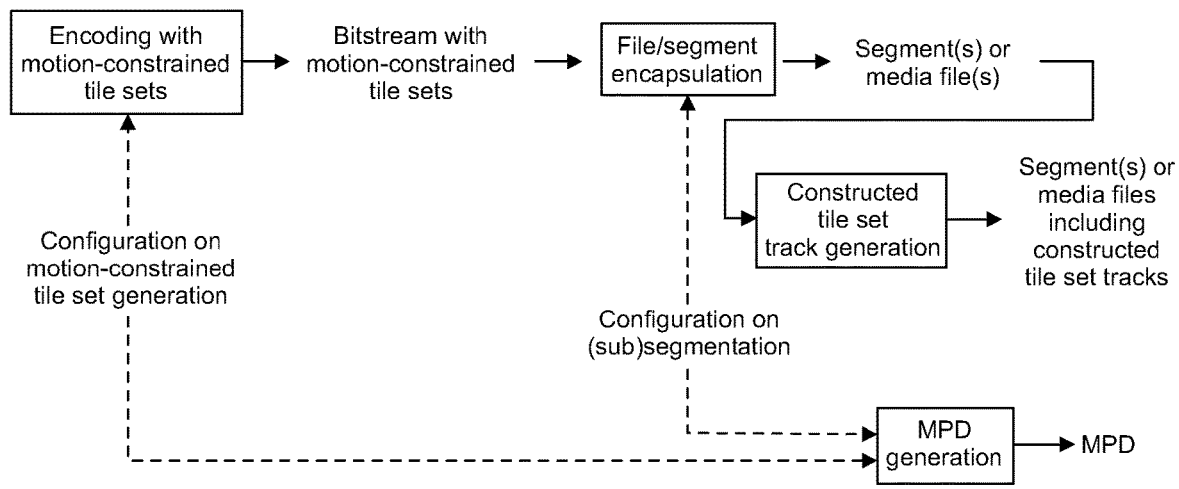
FIG. 12 shows an example of MPD generation according to an embodiment.

The embodiment illustrated with FIG. 9 above may be accompanied by MPD generation as follows and as illustrated in FIG. 12. Compared to the overall configuration shown in FIG. 9, an MPD is generated that includes the information on tile set tracks and their segments or subsegments, e.g. on the basis of the configuration to create (sub)segments in file/segment encapsulation and/or on the configuration of creating motion-constrained tile sets. Alternatively or additionally, the MPD generation may get as input information on generated constructed tile sets, e.g. their spatial location and size relative to the full picture.

In an embodiment, a full-picture track corresponds to a first Representation and a constructed tile set track (having references to the full-picture track) corresponds to a second Representation. In the MPD generation, the first Representation is indicated to be in a first Adaptation Set and the second Representation is indicated to be in a second Adaptation Set.

In an embodiment, a first SRD is included in the first Adaptation Set and a second SRD is included in the second Adaptation Set. The first SRD and the second SRD indicate the Adaptation Sets to have the same reference space, e.g. by having the same value of source_id as explained earlier. The location and size of the motion-constrained tile set represented by the constructed tile set track is indicated in the second SRD in relation to the full picture dimensions that may be indicated in the first SRD.

In an embodiment, a player concludes that the first Adaptation Set and the second Adaptation Set represent the same reference space, e.g. based on them having the same value of source_id as explained earlier. The player further concludes the relative size and position of the first Adaptation Set relative to the second Adaptation Set. Based on e.g. the prevailing viewing direction and prevailing displayed field of view, the player chooses the Adaptation Set that best suits its viewing conditions.

In ISO/IEC 14496-15 ("Carriage of network abstraction layer (NAL) unit structured video in the ISO base media file format"), the extractor structure is meant for extracting one or more entire NAL units. For the purpose of the embodiments described herein, extracting partial (not entire) NAL unit(s) is needed, which may be achieved by an extractor constructor, as defined above. A NAL-unit-like structure may be defined to comprise constructors whose execution results into one or more entire NAL units. This feature can be achieved with the following changes in the extractor structure of ISO/IEC 14496-15, but it needs to be understood that embodiments are not limited to this syntax or semantics

```
ExtractorPayload structure
class aligned(8) Extractor ( ) {
    NALUnitHeader( );
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
is changed to:
class aligned(8) ExtractorPayload ( ) {
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
class aligned(8) Extractor ( ) {
    NALUnitHeader( );
    ExtractorPayload( );
}
```

Here, track_ref_index indicates the track from where data is extracted, sample_offset indicates the sample from where data is extracted, data_offset indicates an offset within the sample starting from which the data is extracted, and data_length indicates the number of bytes to be extracted. The NALUnitHeader structure contains a NAL unit header.

InlineNALUnitData structure contains the data bytes to be included in the constructed NAL unit.

```
class aligned(8) InlineNALUnitData ( ) {
    unsigned int(8) length;
    unsigned int(8) inline_data[length];
}
```

Herein, length is the number of bytes to be included in the constructed NAL unit, and inline_data is the data bytes to be included in the constructed NAL unit.

For constructing a NAL unit, at least two different options may be provided. In the first option, extractors of HEVC are re-defined so that they can be constructed from more than one extent. An extent can either be ExtractorPayload or InlineNALUnitData.

The syntax may be as the following:

```
class aligned(8) Extractor ( ) {
    NALUnitHeader( );
    do {
        unsigned int(8)    nal_unit_extent_type;
        if( nal_unit_extent_type == 0 )
            ExtractorPayload( );
        else // if( nal_unit_extent_type == 1 )
            InlineNALUnitData( );
    } while( !EndOfNALUnit( ) )
}
```

In the second option, a NALUnitConstructor structure is specified. Resolving NALUnitConstructor results into one or more entire NAL units.

```
class aligned(8) NALUnitConstructor ( ) {
    NALUnitHeader( );
    do {
        unsigned int(8)    nal_unit_extent_type;
        if( nal_unit_extent_type == 0 )
            ExtractorPayload( );
        else // if( nal_unit_extent_type == 1 )
            InlineNALUnitData( );
    } while( !EndOfNALUnit( ) )
}
```

The semantics of NALUnitHeader are identical to those of Extractor except that another nal_unit_type value is used, e.g. nal_unit_type equal to 50 is used.

The cost of the change caused by the first option compared to conventional use of extractors that extract one or more entire NAL units is one additional byte. Since this cost is moderate, the first option may be preferred over the second option of a separate NALUnitConstructor structure.

In both options, nal_unit_extent_type equal to 0 specifies that the next extent is ExtractorPayload. nal_unit_extent_type equal to 1 specifies that the extent is InlineNALUnitData. Values greater than 1 are reserved.

The resolving of the proposed extractor or NAL unit constructor structure may be required to be supported in players supporting certain sample entry four-character code(s), such as 'hvc2' and 'hev2'.

In an embodiment, a constructed tile set track is generated including proposed extractor or NAL unit constructor structure(s), which extracts a motion-constrained tile set from a full-picture track (e.g. with sample entry code 'hvc1' or 'hev1'). The constructed tile set track may have a sample entry code, such as 'hvc2' or 'hev2', that indicates the underlying coding format, such as HEVC, and the use of extractor or NAL unit constructor structure.

In an embodiment, a player determines to parse, decode and play a full-picture-compliant tile set track, e.g. marked with 'hvc2' or 'hev2' sample entry code. The player resolves or executes the constructors included in the samples of the track to obtain a full-picture-compliant tile set bitstream. The player then decodes the full-picture-compliant tile set bitstream with the conventional decoding process, such as the HEVC decoding process.

Various embodiments relating to the implementation with HEVC or any other codec with similar features are described herein below.

In an embodiment, parameter sets of a full-picture-compliant tile set track are copied from the original bitstream with one or more of the following modifications:

The indicated level may be set to a value that is sufficient for the tile set decoding rather than the full-picture decoding. The temporal motion-constrained tile set SEI message may contain a level value (mcts_level_idc[i]) that is appropriate to be used in the modified parameter set.

Picture width and height may be set to the values matching to the tile set rather than the full picture.

Conformance cropping window may be set to the values matching to the tile set, or may be indicated to be absent in which case the full picture area of the tile set bitstream is output.

The tile grid may be indicated for the tile set rather than for the full picture.

In an embodiment, parameter sets are included in the sample entry description of the tile set track(s). In an embodiment, parameter sets are included in samples of the tile set track(s) (alternatively or additionally to including parameter sets in sample entry description of the tile set track(s)). In an embodiment, parameter sets are included in-line in samples. In an embodiment, parameter sets are, alternatively or additionally to including parameter sets in-line in samples, constructed in samples. For example, a part of a parameter set may be extracted from a sample of another track, and another part of a parameter set may be included using an in-line constructor.

In an embodiment, NAL unit header(s) of a tile set track are included using an in-line constructor.

In an embodiment, slice segment headers are included in samples of a tile set track using an in-line constructor. In an embodiment, additionally or alternatively to including slice segment headers with in-line constructor, slice segment headers may be extracted from another track. For example, part of the slice segment header may be extracted from a sample of another track, and another part of the slice segment header may be included using an in-line constructor. One or more of the following may need to be modified compared to the respective slice segment header of the original full-picture bitstream:
- indication of the first slice of a picture (in HEVC, first_slice_segment_in_pic_flag)
- the slice address or the location of the first block (e.g. CTU) of the slice (in HEVC, slice_segment_address)
- entry point offsets (each pointing to a start of a tile), when present and when the number of tiles in a slice segment changes In an embodiment, a slice segment header is added to the tile set track when a tile row in the motion-constrained tile set does not start with a slice segment header and the width of the motion-constrained tile set is less than the picture width of the original full-picture bitstream.

Figure 13:
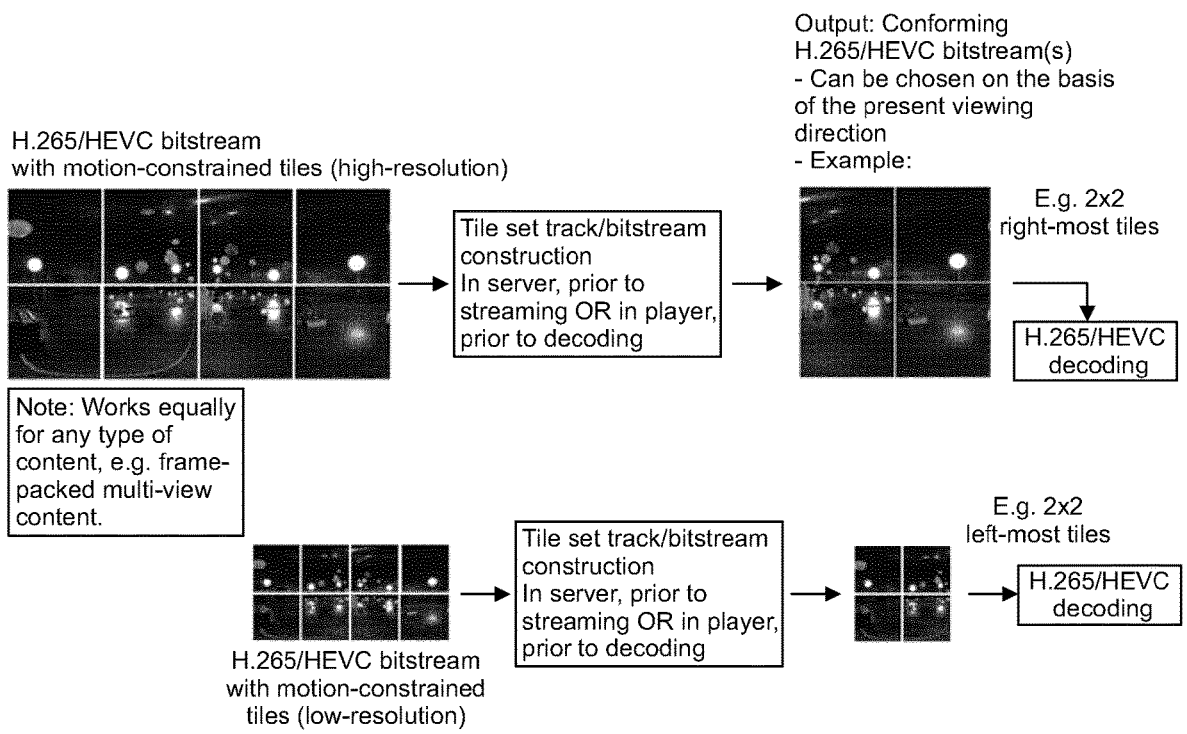
FIG. 13 shows an example of applying the embodiments to different versions of the same content with different spatial resolution.

As becomes evident from the above, the method can be applied in a coordinated manner for several encoded versions of the same content. FIG. 13 illustrates how motion-constrained tile set tracks/bitstreams can be constructed from two H.265/HEVC bistreams having same content but with different resolutions.

The encoded versions may differ e.g. in one or more of the following:
Bitrate
Picture quality, which may have obtained through using a different quantization parameter value
Spatial resolution
Bit-depth per color component
Dynamic range
Color gamut Considering, for example, two versions of the same content coded with different spatial resolution as shown in FIG. 13, then in an embodiment, the boundaries of motion-constrained tile sets in these two versions are spatially collocated. This enables creation of spatially non-overlapping tile set tracks or bitstreams having different resolutions. In an embodiment, the boundaries of motion-constrained tile sets in these two versions need not be spatially collocated. The motion-constrained tile sets in different resolutions may be selected e.g. for streaming and/or for decoding in a manner that the overlap between the tile set tracks or bitstreams of different resolutions is non-existing or moderate.

One or more high-resolution tile set tracks or bitstreams are constructed from the high-resolution version. One or more low-resolution tile set tracks or bitstreams are constructed from the low-resolution version. In an embodiment, the tile set tracks or bitstreams are constructed in a manner that the entire picture area (or equivalently the entire field of view) of the content is covered. In another embodiment, the tile set tracks or bitstreams are constructed in a manner that a sufficient field of view for displaying is covered, taking into account possible subsequent changes in the viewing direction. In an embodiment, the high-resolution tile set track(s) may be constructed from the motion-constrained tile set(s) that cover the present viewing direction and field of view.

Figure 14:
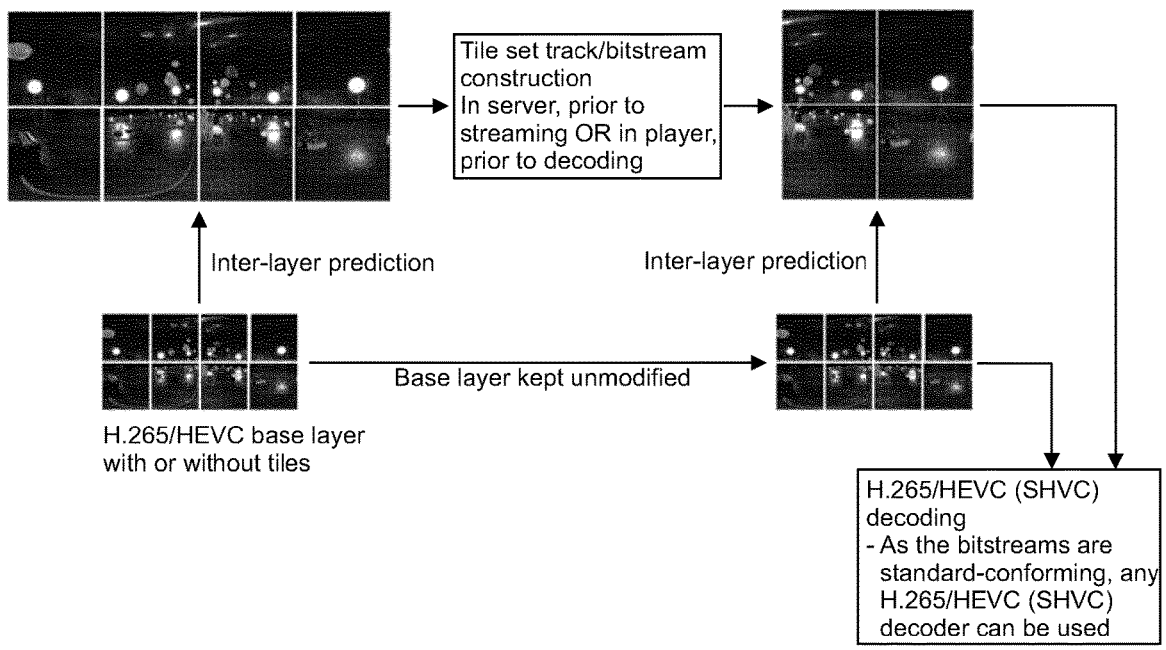
FIG. 14 shows an example of applying the embodiments to different scalability layers of the same content with different spatial resolution.

As becomes evident from the above, the method can be applied in a coordinated manner for several encoded layers of the same content. FIG. 14 illustrates how motion-constrained tile set tracks/bitstreams can be constructed from two H.265/HEVC scalability layers having same content but with different resolutions.

The encoded layers may differ e.g. in one or more of the following:
Bitrate
Picture quality, which may have obtained through using a different quantization parameter value
Spatial resolution
Bit-depth per color component
Dynamic range
Color gamut Considering, for example, two layers of the same content coded with different spatial resolution, then the base layer need not be coded with tiles or motion-constrained tiles. The base layer may be coded with another codec, such as H.264/AVC. No tile set track or bitstream construction is performed for the base layer.

A predicted layer uses inter-layer prediction from the base layer.

One or more high-resolution tile set tracks or layers are constructed from the predicted layer. In an embodiment, the high-resolution tile set track(s) or layer(s) may be constructed from the motion-constrained tile set(s) that cover the present viewing direction and field of view.

In an embodiment, reference layer location offsets, such as scaled reference layer offsets, or alike are inserted into the tile set track or bitstream (e.g. in a picture parameter set) to indicate which part of the base-layer picture area the predicted layer corresponds to. In an embodiment, a decoder decodes reference layer location offsets, such as scaled reference layer offsets, or alike from the tile set track or bitstream (e.g. from a picture parameter set) to conclude which part of the base-layer picture area the predicted layer corresponds to. The decoder or a displaying process may use the information to select samples from the decoded base-layer and enhancement-layer pictures to be displayed. For example, if the field of view required for displaying is not fully covered by the enhancement layer picture(s), parts of the base-layer picture not covered by the enhancement layer can be selected for displaying.

In an embodiment, the base layer is coded with motion-constrained tiles, which collocate with those of the predicted layer. In addition, the inter-layer prediction is constrained in encoding in a manner that no sample values or motion vector information outside the collocated tile in the base-layer are needed for inter-layer prediction of a tile in the predicted layer. The base layer or the base layer track is subject to layer or tile set track construction in a manner that the collocated motion-constrained tile sets are constructed for the base layer and the predicted layer.

Figure 15:
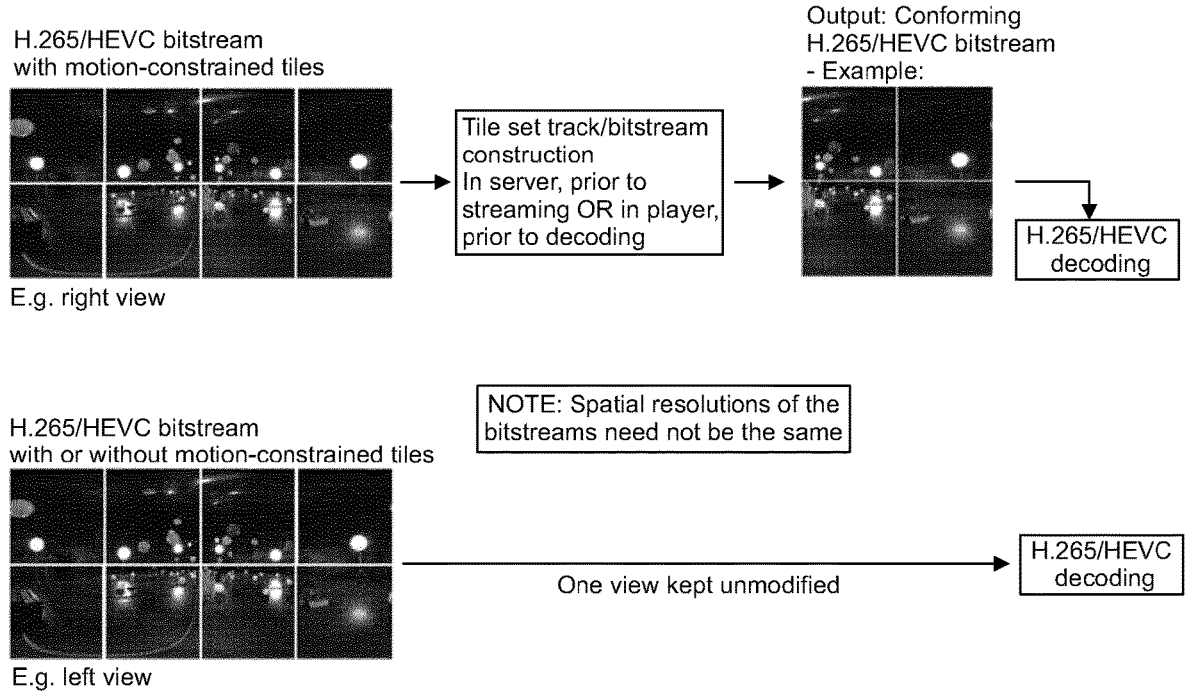
FIG. 15 shows an example of an embodiment applied to stereoscopic video coding.

FIG. 15 illustrates an embodiment applied for stereoscopic video coding. It is noted that while the example figure illustrates a stereoscopic equirectangular panorama, the method is not limited to that format but equally applies to other stereoscopic formats, such as the stereoscopic cubemap format. It also remarked that while the figure below illustrates two-view coding, the method is not limited to two views only applies to multiview coding with a greater number of views than two.

In FIG. 15, one view (e.g. the left view) is coded with or without motion-constrained tiles and can be coded with any codec, such as HEVC (e.g. Main profile) or H.264/AVC. The other view is coded using motion-constrained tiles, and one or more tile set tracks or bitstreams are constructed from that other view. The views need not have the same spatial resolution or other characteristics (e.g. bitrate, picture quality, bit-depth per color component, dynamic range, and/or color gamut).

The player may choose the tile set track or bitstream to be streamed and/or decoded e.g. based on the current viewing direction. As one view is entirely transmitted, the player may handle a sudden change of viewing direction by displaying content from only one view (in the absence of the respective content from the other view).

In an embodiment, both views are coded using motion-constrained tiles, and one or more tile set tracks or bitstreams are constructed from each view. The views need not have the same spatial resolution or other characteristics (e.g. bitrate, picture quality, bit-depth per color component, dynamic range, and/or color gamut).

The player may choose the tile set track or bitstream to be streamed and/or decoded from each view e.g. based on the current viewing direction. This embodiment may suit for example viewing environments where rapid changes of viewing direction are unlikely or will not happen.

In an embodiment, both views are coded with multiple resolutions, as described above in the embodiments of "Multi-resolution partial picture decoding based on motion-constrained tile sets". For one view or both views, the player chooses one or more motion-constrained tile set(s) of a view to be streamed and/or decoded at a high resolution, while some or all of the remaining (i.e. non-collocated) tile sets are streamed and/or decoded at a low resolution.

The embodiments can be applied for stereoscopic and multiview video coding with inter-view prediction between the views. The method is not limited to any particular format but equally applies to any stereoscopic or multiview format, such as the stereoscopic equirectangular panorama format and the stereoscopic cubemap format.

In an embodiment, one view (e.g. the left view) is coded with or without motion-constrained tiles and can be coded with any codec, such as HEVC (e.g. Main profile) or H.264/AVC. The other view is coded using motion-constrained tiles, and one or more tile set tracks or bitstreams are constructed from that other view. Inter-view prediction is applied between the views.

The player may choose the tile set track or bitstream to be streamed and/or decoded e.g. based on the current viewing direction. As one view is entirely transmitted, the player may handle a sudden change of viewing direction by displaying content from only one view (in the absence of the respective content from the other view).

This embodiment requires the coding format and decoding capability to support views having different spatial resolutions. It is noted that e.g. MV-HEVC does not allow such. In general, inter-view prediction may include inter-layer processing, such as scaling for different bit-depths or resampling sample arrays and/or motion fields, and hence the views need not have the characteristics (e.g. bit-depth per color component, dynamic range, and/or color gamut).

Figure 16:
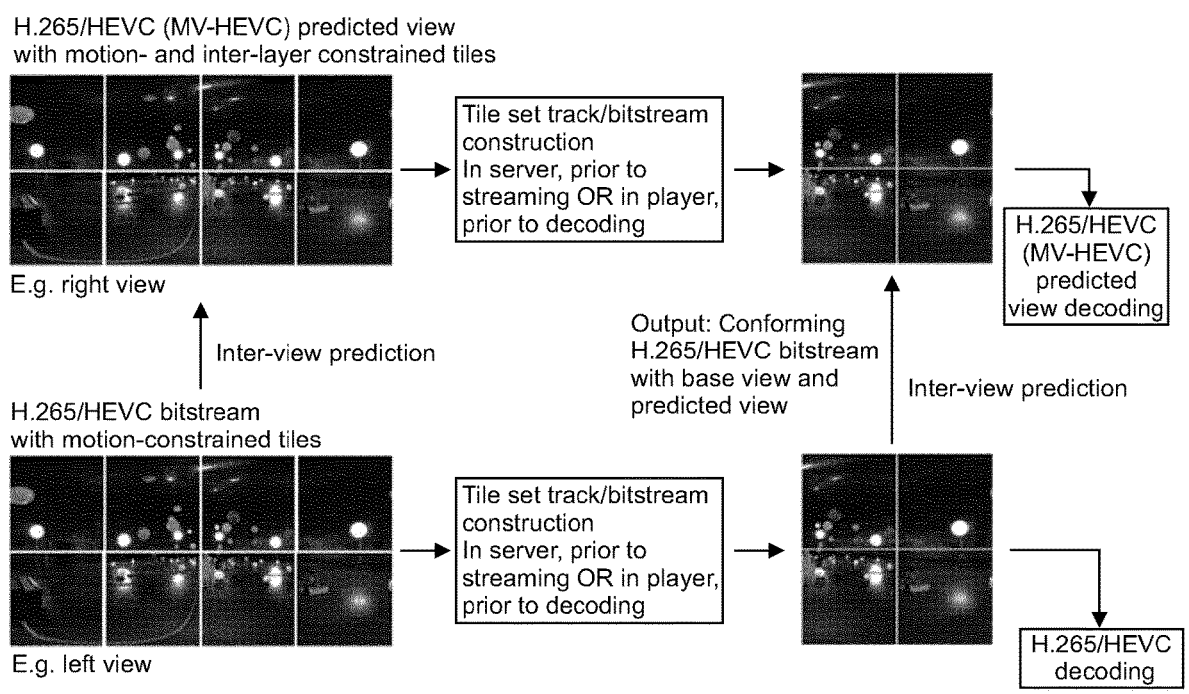
FIG. 16 shows an example of an embodiment applied to stereoscopic video coding with inter-view prediction.

Another embodiment is illustrated in FIG. 16. A base view (e.g. the left view) is coded with motion-constrained tiles. One or more tile set tracks or bitstreams are constructed from the base view. A predicted view is coded with inter-view prediction from the base view. The predicted view is coded using motion-constrained tiles that are additionally inter-layer constrained tiles. The inter-layer constrained tiles are constrained in a manner that only the samples and motion data of the collocated tiles in the base view are used as reference for inter-view prediction. One or more tile set tracks or bitstreams are constructed from the predicted view.

When collocated tile set tracks or layers are constructed from the views, the resulting tile set tracks and bitstream are full-picture-compliant. For example, when the base view complies with HEVC Main profile and the predicted view complies with HEVC Multiview Main profile, the base and predicted views in the resulting tile set tracks and bitstream also comply with HEVC Main profile and HEVC Multiview Main profile, respectively.

The player may choose the tile set track or bitstream to be streamed and/or decoded from both views e.g. based on the current viewing direction. This embodiment may suit for example viewing environments where rapid changes of viewing direction are unlikely or will not happen.

In an embodiment, more than one multiview bitstream is encoded, each with different resolution and/or other characteristic, such as bitrate, picture quality, bit-depth per color component, dynamic range, and/or color gamut. For one view or both views, the player chooses one or more motion-constrained tile set(s) of a view to be streamed and/or decoded at a high resolution, while some or all of the remaining (i.e. non-collocated) tile sets are streamed and/or decoded at a low resolution. For example, the player can choose one or more motion-constrained tile set(s) to be streamed and/decoded at high resolution based on the current viewing direction.

Figure 17:
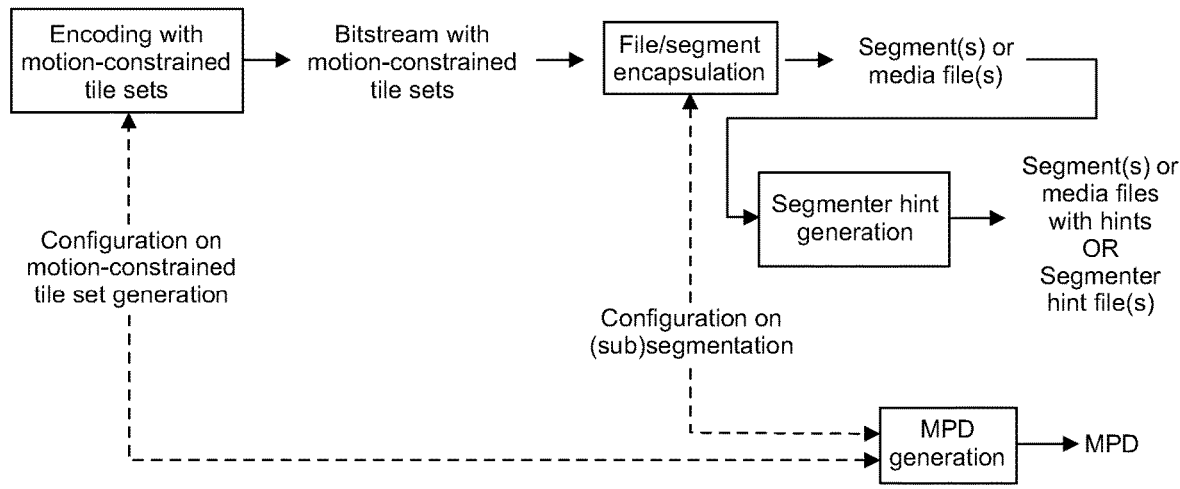
FIG. 17 shows an example of segmenter hint generation according to an embodiment.

An embodiment for segmenter hint generation is illustrated in FIG. 17. The steps "Encoding with motion-constrained tile sets" and "File/segment encapsulation" operate like described in other embodiments. The step "Segmenter hint generation" creates instructions (which may be also called hints) according to which a segment or a subsegment for a tile set track can be generated. The instructions may for example comprise a list of constructors, which are intended to be executed sequentially. There may be different types of constructors available, such as an in-line constructor containing the data to be included in the segment or subsegment generated according to the instructions and an extractor copying the data by reference to another file or track, at an indicated byte location (which may be indicated through identifying a sample and a byte position within a sample), and an indicated byte range to be copied by reference.

In an embodiment, the file/segment encapsulation generates pre-constructed tile set tracks, which may be full-picture-compliant. Furthermore, the file/segment encapsulation generates constructed full-picture track(s) that use pre-constructed tile set tracks as reference for construction. The instructions may be stored in the same file with the segment(s) or media file(s), or they may be stored in separate segment hint file(s). The format of the instructions may but need not comply with ISOBMFF (or more generally the format used for the segment(s) or media file(s)). For example, the instructions may form a track (which may be called e.g. MPEG-DASH segment hint track) according to ISOBMFF, and each sample of the track may provide instructions to construct a segment or subsegment.

In an embodiment, an MPD is generated that includes the information on tile set tracks and their segments or subsegments, constructed according to the segmenter hints. The MPD generation can be similar to what is described earlier in the "MPD generation" section.

In an embodiment, a full-picture track, if any, corresponds to a first Representation, a tile set track corresponds to a second Representation. In the MPD generation, the first Representation is indicated to be in a first Adaptation Set and the second Representation is indicated to be in a second Adaptation Set.

In an embodiment, a first SRD is included in the first Adaptation Set and a second SRD is included in the second Adaptation Set. The first SRD and the second SRD indicate the Adaptation Sets to have the same reference space, e.g. by having the same value of source_id as explained earlier. The location and size of the motion-constrained tile set represented by the tile set track is indicated in the second SRD in relation to the full picture dimensions that may be indicated in the first SRD.

In an embodiment, a player concludes that the first Adaptation Set and the second Adaptation Set represent the same reference space, e.g. based on them having the same value of source_id as explained earlier. The player further concludes the relative size and position of the first Adaptation Set relative to the second Adaptation Set. Based on e.g. the prevailing viewing direction and prevailing displayed field of view, the player chooses the Adaptation Set that best suits its viewing conditions.

Figure 18:
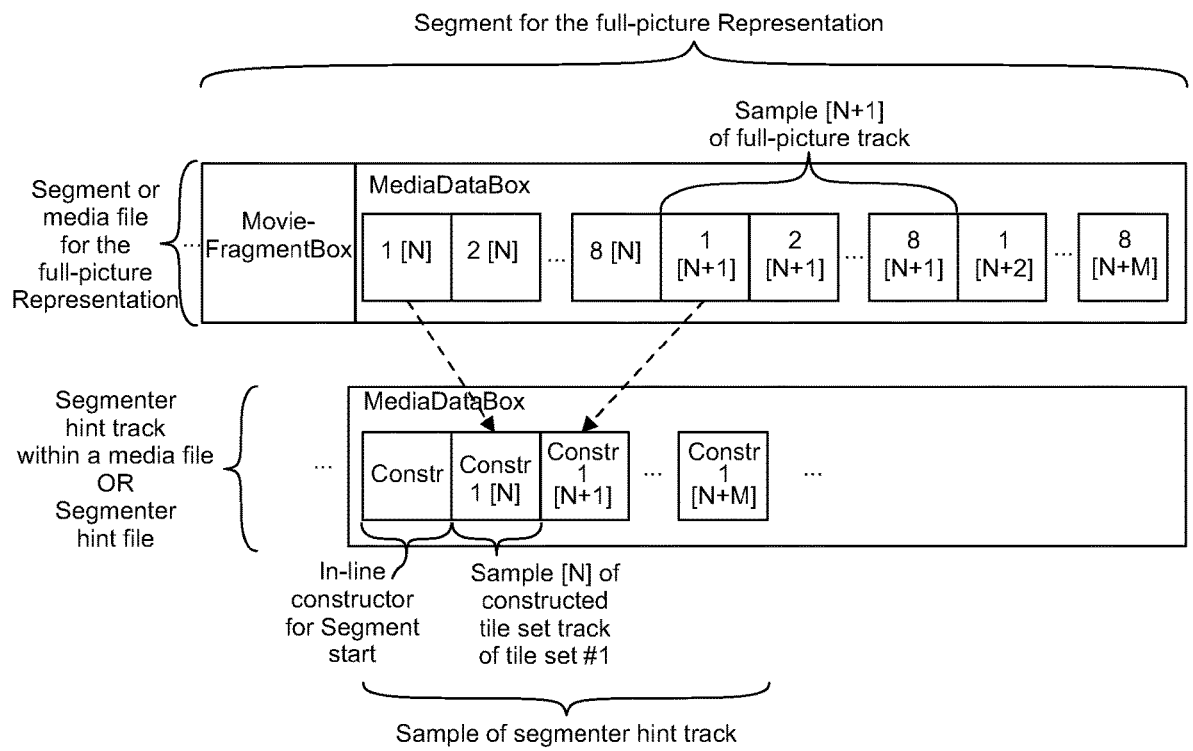
FIG. 18 shows an example of a segmenter hint track or a segmenter file according to an embodiment.

FIG. 18 illustrates a segmenter hint track or a segmenter file with constructors extracting motion-constrained tile sets from a full-picture track.

In an embodiment, URL information may be added to the segmenter hint track or a segmenter file, such that enables matching a correct part of the segmenter hint track (e.g. a hint sample) or a segmenter file to a URL used in the request and concluded from the MPD information and/or earlier (sub)segments (e.g. byte range information). The URL information may be included for example using a URL template scheme similar or identical to that used in the MPD schema or including a URL per each (sub)segment that can be generated by decoding the segmenter hint track or the segmenter file.

Figure 19:
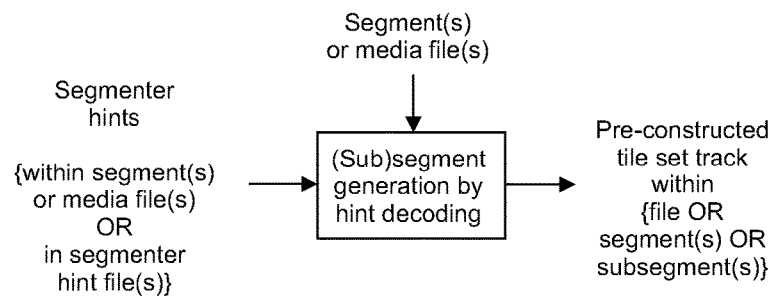
FIG. 19 shows the operation of a server or a segmenter according to an embodiment.

FIG. 19 illustrates the server or segmenter operation, wherein according to an embodiment, a server or a segmenter that is operationally connected with a server parses the segmenter hints. The segmenter may for example be a server-side script that is launched by an HTTP server. The server or segmenter parses the segmenter hints and generates the segments or subsegments according to the parsed hints. The segment or subsegments are part of a valid pre-constructed tile set track.

In an embodiment, the server and/or the segmenter receives a URL of the requested (sub)segment, e.g. through an HTTP GET request. The server or the segmenter parses the URL information included in the segmenter hint track or the segmenter file to find the instructions or hints that match with the URL of the requested (sub)segment. The server or the segmenter then executes these found instructions or hints to create the requested (sub)segment. The server or the segmenter then responds to the request by transmitting the created (sub)segment, e.g. in a response to the HTTP GET request.

In an embodiment, a specifically marked instruction or hint is generated as part of the "Segmenter hint generation" for the initialization segment. When decoded, this instruction or hint generates the initialization segment for the pre-constructed tile set track. The initialization segment may for example comprise the FileTypeBox and the MovieBox.

In an embodiment, the file/segment encapsulation generates pre-constructed tile set tracks, which may be full-picture-compliant. Furthermore, the file/segment encapsulation generates constructed full-picture track(s) that use pre-constructed tile set tracks as reference for construction.

In an embodiment, an MPD is generated that includes the information on pre-constructed tile set tracks, and constructed full-picture track(s) that use pre-constructed tile set tracks as reference for construction. In an embodiment, an MPD is generated similarly to what is described above for tile set track(s) constructed according to the segmenter hints and full-picture track(s).

In an embodiment, the samples of a movie fragment of the pre-constructed tile set tracks are arranged contiguously in a manner that the samples of a first pre-constructed tile set track precede the samples of a second pre-constructed tile set track and so on. The samples of the constructed full picture track(s) follow the samples of the pre-constructed tile set tracks that are used as reference for construction. The boundaries between samples of different tracks may be indicated e.g. by using the SubsegmentIndexBox of ISOBMFF. A LevelAssingmentBox or alike may be included by a file writer to indicate that track-based levels indicated by SubsegmentIndexBox are in use.

Figure 20:
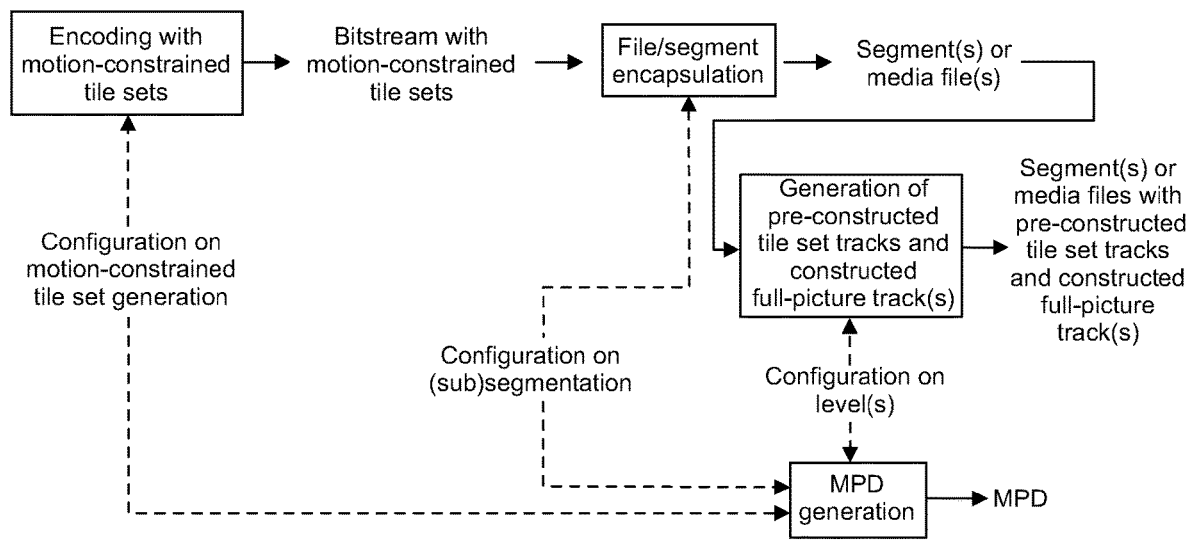
FIG. 20 shows an example of an embodiment involving generation of pre-constructed tile set tracks.

In an embodiment, which is illustrated in FIG. 20, MPD generation includes information on SubRepresentations into the MPD, based on levels generated for the segment(s). For example, a MIME type and/or spatial relationship information (e.g. SRD) may be included in the MPD. A MIME type indicated for a SubRepresentation corresponding to a pre-constructed tile set track may indicate a profile and level sufficient for decoding the respected motion-constrained tile set. The spatial relationship information for each pre-constructed tile set track may indicate its position and size relative to the indicated full picture size. These information may be carried using SubRepresentation-level SRD, as specified in MPEG-DASH.

Figure 21:
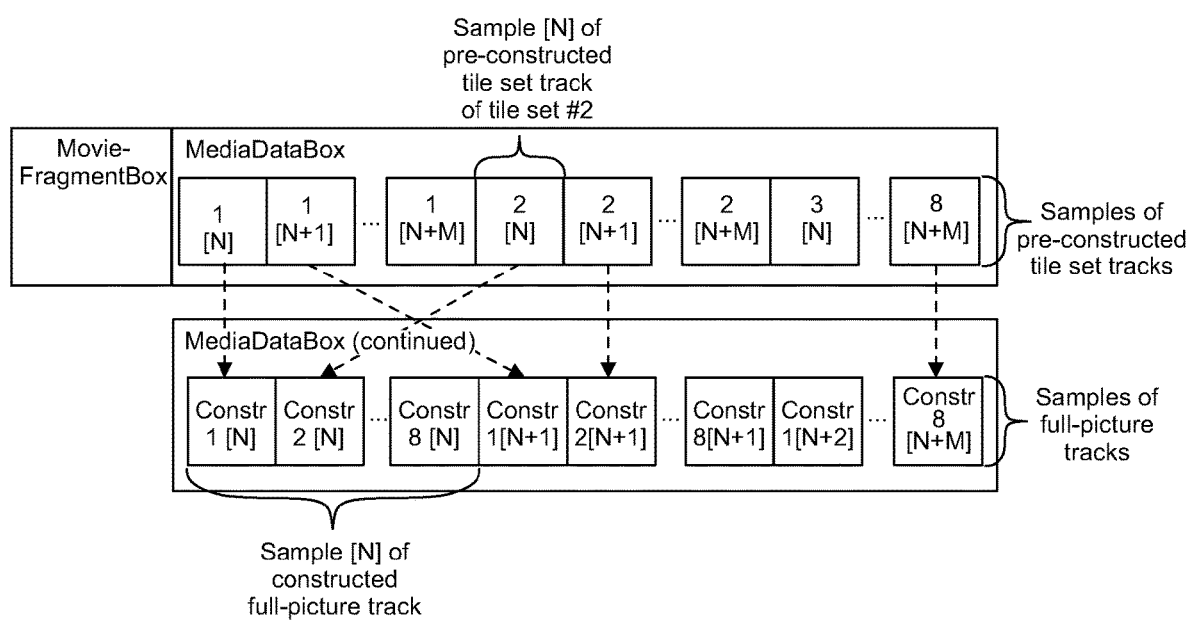
FIG. 21 shows an example of arranging data chunks of pre-constructed tile set tracks and full-picture tracks in a file according to an embodiment.

The result of the process above is illustrated (with reference but not limited to ISOBMFF) in FIG. 21.

In an embodiment, a player receiving Segment(s) as described above operates as follows: The player parses the spatial relationship information for pre-constructed tile set tracks e.g. from SubRepresentation-level SRD, as specified in MPEG-DASH. Based on the parsed spatial relationship information, the player dynamically determines, e.g. on Segment or Subsegment basis, which pre-constructed tile set tracks are requested. The player obtains a start of a Segment or Subsegment, containing the SubsegmentIndexBox or alike that indicates the byte boundaries between levels, i.e. between pre-constructed tile set tracks. The player concludes byte ranges to be requested accordingly, and issues requests, such as HTTP GET requests, accordingly. As a response from the server-side, the player obtains the requested data for the pre-constructed tile set tracks, which are then decoded and may be played.

In an embodiment, a base view (e.g. the left view) is coded with motion-constrained tile sets. A predicted is like-wise coded with motion-constrained tile sets. The boundaries of the motion-constrained tile sets may be aligned between the views (but generally need not be aligned). The tile sets in the predicted view are also inter-layer constrained so that inter-layer prediction uses sample values only within the respective tile set of the base view. Inter-view prediction is constrained so that only a subset of base-view pictures may be used as reference for inter-view prediction. This subset may be referred to as the inter-view-reference subset. For example the inter-view-reference subset may comprise IRAP pictures of the base view, and IRAP pictures may be aligned across views, i.e. when there is an IRAP picture in the base view, there is also an IRAP picture in the predicted view of the same access unit, and vice versa.

In a tile set track/bitstream construction phase, one or more tile set tracks or bitstreams are constructed from the base view (e.g. as described in other embodiments, e.g. relating to FIG. 16). One or more tile set tracks or bitstreams are constructed from the predicted view (e.g. as described in other embodiments, e.g. relating to FIG. 16). When collocated tile set tracks or layers are constructed from the views, the resulting tile set tracks and bitstream are full-picture-compliant. For example, when the base view complies with HEVC Main profile and the predicted view complies with HEVC Multiview Main profile, the base and predicted views in the resulting tile set tracks and bitstream also comply with HEVC Main profile and HEVC Multiview Main profile, respectively.

The base view part of the tile set track or bitstream can be extracted unless already done in the previous phase.

In a phase referred to as "rewriting predicted layer to single-view profile bitstream", the constructed tile set track or bitstream of the predicted view is processed to be single-view profile compliant. A second-view track is generated by including base-view data by reference into the second-view track. This data included by reference comprises fully or partially the inter-view-reference subset of the base-view pictures from which coded pictures of the predicted view may be predicted. The second-view track also includes, in-line (in some embodiments) or by reference (in other embodiments), coded data of the predicted view. Samples of the second-view track may comprise constructors, such as extractors and in-line constructors. The second-view track is indicated to comply with a single-view decoding process, such as HEVC Main profile decoding.

The outputs of the embodiment are a base-view full-picture-compliant tile set track or bitstream and a second-view full-picture-compliant tile set track or bitstream. Both full-picture-compliant tile set tracks or bitstreams are decodable, as such, by a standard video decoder, such as H.265/HEVC decoder. Alternatively, the output may be instructions to construct base-view and second-view full-picture-compliant tile set tracks or bitstreams.

The phases of the embodiment may be performed in opposite order, meaning that the order of tile set track/bitstream construction and rewriting the predicted layer to be a single-view profile bitstream may be reversed. In other words, first a single-view bitstream (of full pictures) may be generated and then a single-view tile set bitstream may be generated.

The phases of the embodiment may be combined essentially into one operation. For example, a same track may be generated to extract tile sets of a predicted view and to include inter-view reference subset by reference. In other words, the same track or sample(s) may perform both constructing a tile set and rewriting a multiview bitstream to be single-view bitstream.

In the above, some embodiments have been described in relation to the equirectangular panorama video format, in either its monoscopic or stereoscopic version. It needs to be understood that embodiments are not limited to the equirectangular panorama format. Embodiments can be similarly applied to any picture or video format, including but not limited to, for example, the following:

Conventional two-dimensional image format, e.g. captured with a conventional lens and sensor. The format may be rectilinear.

Fisheye image format, e.g. captured with a fisheye lens, covering a wide field of view, such as about 180 degrees Cubemap format, in its monoscopic or stereoscopic version Multiview frame-packed format, in which pictures of different cameras are packed (as constituent frames) into the same frame prior to encoding and can be extracted from decoded frames after decoding. The constituent frames can represent e.g. any of the formats above, e.g. conventional two dimensional images, fisheye images, cubemap sides from monoscopic or stereoscopic cubemaps, or views of stereoscopic panorama format.

In an embodiment, any of the above-described embodiments is applied to a single-view or frame-packed fisheye pictures in a manner that a motion-constrained tile set is encoded for a spatial subset of a fisheye image area. Similarly to fisheye picture(s), the embodiment can apply to any other type of wide field-of-view picture(s). The spatial subset may for example represent an image area that suits displaying on a conventional flat panel display. The other tiles outside the motion-constrained tile set need not be motion-constrained, i.e. may use inter prediction with reference to samples within the motion-constrained tile set in a reference picture. A tile set track and/or bitstream for the motion-constrained tile set is constructed, as described in other embodiments.

A player may choose to stream and/or decode the constructed motion-constrained tile set track or bitstream, e.g. on the basis of knowledge of the viewing or display equipment being capable of displaying a field-of-view that approximately or exactly matches that of the motion-constrained tile set.

In an embodiment that may be applied with the above-described embodiments for multi-resolution partial picture decoding embodiments with or without scalable video coding, a different picture representation format may be used in different resolutions or layers. For example, a low-resolution version or the base layer of the content may use the equirectangular panorama format, while the high-resolution version or the predicted layer of the content may use the cubemap format.

In an embodiment, the motion-constrained tile sets are selected in the encoding to match the constituent frame boundaries of a frame-packed representation format. For example, if a cubemap is represented in a frame-packed format, each cubemap side is its own constituent frame, and each constituent frame can be encoded as a motion-constrained tile set.

In an embodiment, the content is coded in cubemap format in at least two resolutions. In an embodiment, the player selects the motion-constrained tile sets of a subset of high-resolution cubemap sides according to the prevailing viewing direction. Assuming that viewing is performed with a head-mounted display with about 100 degrees field of view, the player may for example select up to three cubemap sides to be streamed and/or decoded at a high resolution. The remaining cubemap sides to be streamed and/or decoded may be selected from the low-resolution version or may be omitted from streaming and/or decoding.

In an embodiment, the size of motion-constrained tile sets are selected in the encoding on the basis of the expected or known field of view of the viewing equipment and/or viewing behavior. For example, it may be assumed that a typical vertical head orientation when viewing with a head-mounted display is approximately on the equator of spherical video.

In an embodiment, a 360-degree panorama video is partitioned into 12 motion-constrained tiles, each covering 90-degrees horizontal field of view (i.e. four tile columns of equal width), the top most tile row covering 45 degrees of vertical field of view, the center tile row covering 90 degrees of vertical field of view, and the bottom tile row covering 45 degrees of vertical field of view. Assuming that the field of view on a head-mounted display is roughly 100 degrees, streaming and/or decoding of four tile sets is typically sufficient to cover the field of view needed for displaying, particularly when a low-resolution version or base layer can be used to cover any possibly missing areas on the sides of the displayed pictures.

In an embodiment, a 360-degree panorama video is partitioned into 8 motion-constrained tiles, each covering 90 degrees horizontally and vertically. Assuming that the field of view on a head-mounted display is roughly 100 degrees, streaming and/or decoding of four tile sets is typically sufficient to cover the field of view needed for displaying, particularly when a low-resolution version or base layer can be used to cover any possibly missing areas on the sides of the displayed pictures.

In an embodiment, a 360-degree panorama video is partitioned into 12 motion-constrained tiles, each covering 90-degrees horizontal field of view (i.e. four tile columns of equal width), the top most tile row covering 30 degrees of vertical field of view, the center tile row covering 120 degrees of vertical field of view, and the bottom tile row covering 30 degrees of vertical field of view. Assuming that the field of view on a head-mounted display is roughly 100 degrees and that peeking roughly straight ahead (rather than up- or downwards), streaming and/or decoding of two tile sets is typically sufficient to cover the field of view needed for displaying, particularly when a low-resolution version or base layer can be used to cover any possibly missing areas on the sides of the displayed pictures.

It needs to be understood that the values of field of view in the above embodiments of potential motion-constrained tile partitionings are examples and that exact values may be selected e.g. in a manner that CTU rows and/or columns match the motion-constrained tile boundaries. Embodiments are not limited to the number of tiles or the field of view values that are mentioned.

In some embodiments, a set of tiles forms jointly a motion-constrained tile set. In an embodiment applicable e.g. to the 12-tile partitionings as described above, the top tile row forms one motion-constrained tile set (while the tiles of the top tile row need not be motion-constrained individually), and/or the bottom tile row forms one motion-constrained tile set (while the tiles of the bottom tile row need not be motion-constrained individually).

It is noted that several tile sets can be combined into the same constructed tile set track or bitstream. In an embodiment, a first motion-constrained tile set and a second motion-constrained tile set that are not adjacent to each other are combined into the same constructed tile set track or bitstream. In an embodiment, a left-most tile or tile set of the full-picture bitstream is combined into the same constructed tile set track or bitstream with a right-most tile or tile set of the full-picture bitstream. Such a combination may particularly suit 360-degree panorama video, in which case the right-most tile may be located in the constructed tile set track or bitstream on the left of the left-most tile of the same tile row, to maintain spatial continuity.

Figure 22:
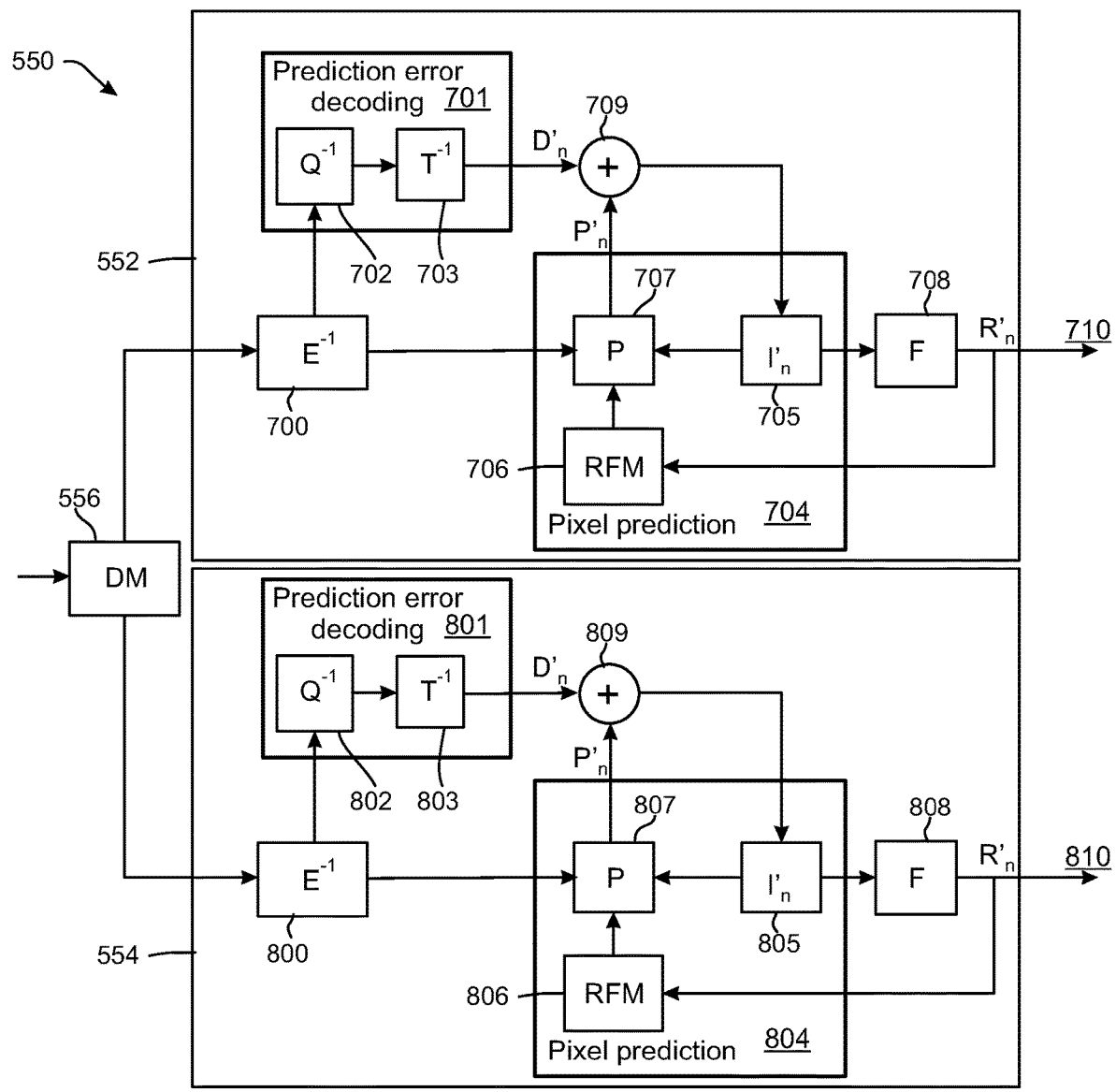
FIG. 22 shows a schematic diagram of a decoder suitable for implementing embodiments of the invention.

FIG. 22 shows a block diagram of a video decoder suitable for employing embodiments of the invention. FIG. 22 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Herein, the decoder should be interpreted to cover any operational unit capable to carry out the decoding operations, such as a player, a receiver, a gateway, a demultiplexer and/or a decoder.

Figure 23:
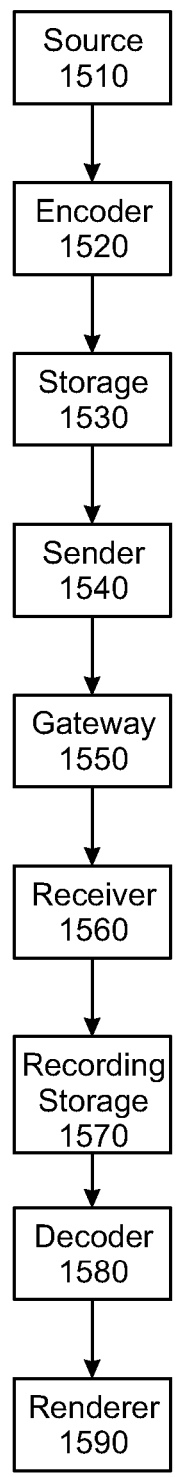
FIG. 23 shows a schematic diagram of an example multimedia communication system within which various embodiments may be implemented.

FIG. 23 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1580 is discussed to simplify the description without a lack of generality The coded media bitstream may be processed further by a decoder 1580, whose output is one or more uncompressed media streams. Finally, a renderer 1590 may reproduce the uncompressed media streams with a loudspeaker or a display, for example. The receiver 1560, recording storage 1570, decoder 1580, and renderer 1590 may reside in the same physical device or they may be included in separate devices.

A sender 1540 and/or a gateway 1550 may be configured to perform switching between different representations e.g. for view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, some embodiments have been described with reference to the term slice segment. It needs to be understood that embodiments apply similarly to other similar picture partitioning units. For example, some coding schemes may not include the concept of slice segments but may have the concept of slices, as defined in video coding standards including H.264/AVC and HEVC, in which case embodiments apply to slices.

In the above, some embodiments have been described in relation to high-resolution and/or low-resolution tile set tracks, bitstreams, and/or layers. It needs to be understood that instead of or in addition to differing in spatial resolution, term high-resolution may be used in embodiments to indicate resulting into a higher quality perception than the term low-resolution e.g. in terms of one or more of the following:
  Picture quality, which may have obtained through using a different quantization parameter value
  Bit-depth per color component
  Dynamic range
  Color gamut In the above, some embodiments have been described in relation to two layers. It needs to be understood that embodiments similarly apply to more than two layers.

In the above, some embodiments have been described in relation to HEVC and/or terms used in the HEVC specification. It needs to be understood that embodiments similarly apply to other codecs and coding formats and other terminology with equivalency or similarity to the terms used in the above-described embodiments.

In the above, some embodiments have been described in relation to ISOBMFF and/or formats derived from ISOBMFF. It needs to be understood that embodiments similarly apply to other file and segment formats, such as the Matroska file format.

In the above, some embodiments have been described in relation to MPEG-DASH or DASH. It needs to be understood that embodiments similarly apply to other forms of streaming over HTTP, such as the Apple HTTP Live Streaming (HLS).

In the above, some embodiments have been described by referring to the term streaming. It needs to be understood that embodiments similarly apply to other forms of video transmission, such as progressive downloading, file delivery, and conversational video communications, such as video telephone.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the claims.

The invention claimed is:

1. An apparatus comprising:
at least one processor; and
at least one non-transitory memory including computer program code, which when executed with the at least one processor, causes the apparatus to:
obtain a full-picture bitstream comprising:
coded pictures, each coded picture comprising a grid of coding tree units and partitioned to one or more tiles containing an integer number of coding tree units forming a rectangle, and
a motion-constrained tile set comprising one or more tiles per coded picture in a manner that no sample value outside the motion-constrained tile set is referred in prediction of any sample within the motion-constrained tile set;
generate instructions to construct a full-picture-compliant tile set track on the basis of the motion-constrained tile set, wherein said full-picture-compliant tile set track is playable as any full-picture track using a parsing and decoding process of full-picture tracks, said instructions comprising an extractor structure that extracts a part of an elementary unit from the full-picture track and wherein the elementary unit is a network abstraction layer unit;
include, in said instructions, the extractor structure that comprises an inline constructor structure that includes one or both of a network abstraction layer header and a slice segment header, and a constructor structure that extracts the motion-constrained tile set from the full-picture track.

2. An apparatus according to claim 1, wherein the motion-constrained tile set is contained in one or more slice segments comprising tiles outside the motion-constrained tile set, wherein to construct said motion-constrained tile set, the apparatus is further caused to:
add a tile column on the right of the motion-constrained tile set into one of the full-picture-compliant tile set track, full-picture-compliant bitstream, instructions to construct the full-picture-compliant tile set track, or a bitstream.

3. An apparatus according to claim 2, wherein the apparatus is further caused to: control an end of a slice segment with tiles of the added tile column.

4. An apparatus according to claim 2, wherein the apparatus is further caused to: indicate in the last tile of the added tile column an end of a slice segment.

5. An apparatus according to claim 2, wherein the apparatus is further caused to:
add, into the full-picture-compliant tile set track or bitstream or into the instructions to construct the full-picture-compliant tile set track or bitstream, information on a conformance cropping window configured to cause decoding to exclude the added tile column from decoding output.

6. An apparatus according to claim 1, wherein the motion-constrained tile set is comprised in one or more slice segments comprising tiles outside the motion-constrained tile set, wherein to construct the motion-constrained tile set, the apparatus is further caused to:
identify a right-most tile within the motion-constrained tile set that is not a last tile of a first slice segment comprising the right-most tile; and modify the right-most tile so that it causes an end of the first slice.

7. An apparatus according to claim 1, wherein to construct the full-picture-compliant tile set track comprises rewriting at least one parameter sets or slice segment headers entirely or partially when compared to those in the full-picture track.

8. An apparatus according to claim 1, wherein the instructions to construct the full-picture-compliant tile set track result into a sequence of segments or subsegments and wherein a uniform resource locator of a segment is indicated with a subset of the instructions that results into the segment.

9. A method comprising:
obtaining a full-picture bitstream comprising:
coded pictures, each coded picture comprising a grid of coding tree units and partitioned to one or more tiles containing an integer number of coding tree units forming a rectangle, and
a motion-constrained tile set comprising one or more tiles per coded picture in a manner that no sample value outside the motion-constrained tile set is referred in prediction of any sample within the motion-constrained tile set;
generating instructions to construct a full-picture-compliant tile set track on the basis of the motion-constrained tile set, wherein said full-picture-compliant tile set track is playable as any full-picture track using a parsing and decoding process of full-picture tracks, said instructions comprising an extractor structure that extracts a part of an elementary unit from the full-picture track and wherein the elementary unit is a network abstraction layer unit; and
including, in said instructions, the extractor structure that comprises an inline constructor structure that includes one or both of a network abstraction layer header and a slice segment header, and a constructor structure that extracts the motion-constrained tile set from the full-picture track.

10. A method according to claim 9, wherein the motion-constrained tile set is characterized with being contained in one or more slice segments that also contain tiles outside the motion-constrained tile set, wherein the method further comprises constructing or generating instructions to construct with:
adding, into the full-picture-compliant tile set track or bitstream or into the instructions to construct the full-picture-compliant tile set track, a tile column on the right of the motion-constrained tile set.

11. A method according to claim 10, further comprising: controlling an end of a slice segment with tiles of the added tile column.

12. A method according to claim 10, further comprising: indicating in the last tile of the added tile column an end of a slice segment.

13. A method according to claim 10, further comprising: adding, into the full-picture-compliant tile set track or bitstream or into the instructions to construct the full-picture-compliant tile set track, information on a conformance cropping window configured to cause decoding to exclude the added tile column from decoding output.

14. A computer program product, stored on a non-transitory computer readable medium, comprising computer-executable computer program code which when executed with an apparatus is configured to cause the apparatus to perform the method of claim 9.

15. An apparatus comprising:
at least one processor; and
at least one non-transitory memory including computer program code, which when executed with the at least one processor, causes the apparatus to:
obtain first characteristics of a first full-picture-compliant tile set track from at least one of a media presentation description or from a media file, wherein said full-picture-compliant tile set track is playable as a full-picture track with parsing and decoding of full-picture tracks;
determine based on the first characteristics to obtain a part or an entirety of the first full-picture-compliant tile set track;
obtain the part of the entirety of the first full-picture-compliant tile set track with extracting an extractor structure that extracts a part of an elementary unit from the full-picture track and wherein the elementary unit is a network abstraction layer unit; and
obtain the part or the entirety of the first full-picture-compliant tile set track with extracting the extractor structure that comprises an inline constructor structure that includes one or both of a network abstraction layer header and a slice segment header, and a constructor structure that extracts a motion-constrained tile set from the full-picture track;
wherein the motion-constrained tile set is included in a full-picture bitstream comprising coded pictures, each coded picture comprising a grid of coding tree units and partitioned to one or more tiles containing an integer number of coding tree units forming a rectangle;
wherein the motion-constrained tile set comprises one or more tiles per coded picture in a manner that no sample value outside the motion-constrained tile set is referred in prediction of any sample within the motion-constrained tile set.

16. An apparatus according to claim 15, wherein the apparatus is further caused to:
decode and play the part or the entirety of the first full-picture-compliant tile set track.

17. An apparatus according to claim 15, wherein the apparatus is further caused to:
obtain, within the first characteristics, information of a covered spatial area or both a covered field of view and a view orientation, wherein said determining is based on the covered spatial area or both the covered field of view and the view orientation.

18. An apparatus according to claim 15, wherein the apparatus is further caused to:
obtain second characteristics of a second full-picture-compliant tile set track from at least one of the media presentation description or from the media file;
conclude from the first and second characteristics that the second full-picture-compliant tile set track has at least one of a lower spatial resolution, bitrate, picture quality, bit-depth per color component, dynamic range or color gamut compared to those of the first full-picture-compliant tile set track;
conclude from the first and second characteristics that the first and second full-picture-compliant tile set tracks represent different spatial parts of a content;
determine based on the above conclusions to obtain a part or an entirety of the second full-picture-compliant tile set track; and
obtain the part or the entirety of the second full-picture-compliant tile set track.

19. A method comprising:
obtaining first characteristics of a first full-picture-compliant tile set track from a media presentation description and/or from a media file, wherein said full-picture-compliant tile set track is playable as any full-picture track using a parsing and decoding process of full-picture tracks;
determining based on the first characteristics to obtain a part or an entirety of the first full-picture-compliant tile set track;
obtaining the part of the entirety of the first full-picture-compliant tile set track with extracting an extractor structure that extracts a part of an elementary unit from the full-picture track and wherein the elementary unit is a network abstraction layer unit; and
obtaining the part or the entirety of the first full-picture-compliant tile set track with extracting the extractor structure that comprises an inline constructor structure that includes one or both of a network abstraction layer header and a slice segment header, and a constructor structure that extracts a motion-constrained tile set from the full-picture track;
wherein the motion-constrained tile set is included in a full-picture bitstream comprising coded pictures, each coded picture comprising a grid of coding tree units and partitioned to one or more tiles containing an integer number of coding tree units forming a rectangle;
wherein the motion-constrained tile set comprises one or more tiles per coded picture in a manner that no sample value outside the motion-constrained tile set is referred in prediction of any sample within the motion-constrained tile set.

20. A computer program product, stored on a non-transitory computer readable medium, comprising computer-executable computer program code which when executed with an apparatus is configured to cause the apparatus to perform the method of claim 19.

* * * * *